(12) United States Patent
Venkataraghavan

(10) Patent No.: US 12,255,947 B2
(45) Date of Patent: Mar. 18, 2025

(54) SYSTEM, METHOD, AND COMPUTER PROGRAM FOR DYNAMIC SERVICE DEPLOYMENT

(71) Applicant: RAKUTEN MOBILE, INC., Tokyo (JP)

(72) Inventor: Krishnan Venkataraghavan, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/005,210

(22) PCT Filed: Nov. 30, 2022

(86) PCT No.: PCT/US2022/051341
§ 371 (c)(1),
(2) Date: Jan. 12, 2023

(87) PCT Pub. No.: WO2024/118065
PCT Pub. Date: Jun. 6, 2024

(65) Prior Publication Data
US 2024/0244104 A1 Jul. 18, 2024

(51) Int. Cl.
*H04L 67/10* (2022.01)
*H04L 41/0803* (2022.01)
*H04L 41/5009* (2022.01)

(52) U.S. Cl.
CPC .......... *H04L 67/10* (2013.01); *H04L 41/0803* (2013.01); *H04L 41/5009* (2013.01)

(58) Field of Classification Search
CPC .. H04L 67/10; H04L 41/0803; H04L 41/5009

USPC .......................................................... 709/223
See application file for complete search history.

(56) References Cited

U.S. PATENT DOCUMENTS

| | | | |
|---|---|---|---|
| 2014/0229607 A1* | 8/2014 | Jung | H04L 43/08 709/224 |
| 2015/0106520 A1 | 4/2015 | Breitgand et al. | |
| 2018/0349121 A1* | 12/2018 | Bagarolo | H04L 67/10 |
| 2019/0311292 A1 | 10/2019 | Arguelles | |

(Continued)

OTHER PUBLICATIONS

International Search Report dated Apr. 7, 2023, issued in International Application No. PCT/US2022/051341.

(Continued)

*Primary Examiner* — Wing F Chan
*Assistant Examiner* — Leon Y Tseng
(74) *Attorney, Agent, or Firm* — Sughrue Mion, PLLC

(57) ABSTRACT

Provided are apparatus, method, and device for managing deployment of one or more services. The apparatus including: a memory storing instructions; and at least one processor configured to execute the instructions to: receive information associated with a service; determine, based on the received information, an optimal deployment configuration; determine whether or not the service is required to be deployed according to the optimal deployment configuration; and based on determining that the service is required to be deployed according to the optimal deployment configuration, output information defining an action for deploying the service according to the optimal deployment configuration.

20 Claims, 14 Drawing Sheets

(56) References Cited

U.S. PATENT DOCUMENTS

2021/0282026 A1* 9/2021 Joyce .................... H04W 24/10
2022/0173961 A1* 6/2022 Lavi .................... H04L 41/0681

OTHER PUBLICATIONS

Written Opinion dated Apr. 7, 2023, issued in International Application No. PCT/US2022/051341.

* cited by examiner

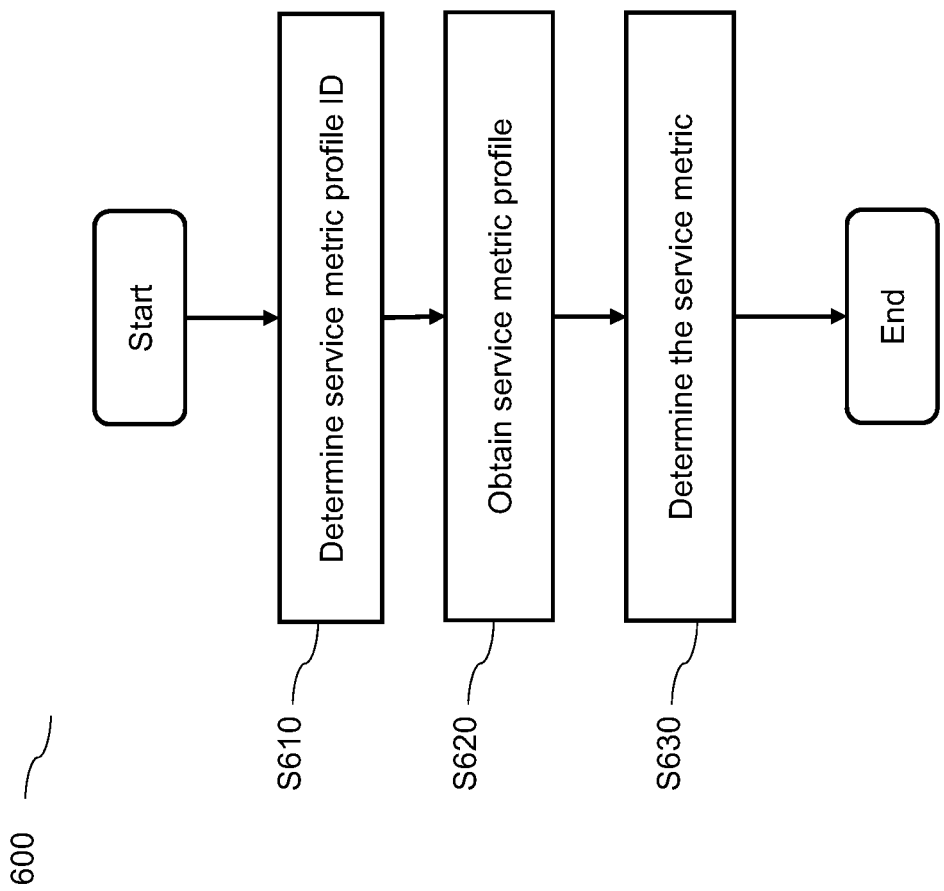

| Service Type | Service Metric Profile ID | Service Metrics | Service Info |
|---|---|---|---|
| Web Browsing | Service Metric Profile 1 | # Service Metrics:<br>- Latency< x1ms<br>- Page load<= x2ms | # Service name:<br>- Service 1<br># App:<br>- App 1<br>#URL:<br>- X...n |
| | Service Metric Profile 2 | # Service Metrics:<br>- Latency< x3ms<br>- Page load<= x4ms | # Service name:<br>- Service 1<br># App:<br>- App 1<br>#URL:<br>- X...n |
| | Service Metric Profile 3 | # Service Metrics:<br>- Latency< x5ms<br>- Page load<= x6ms | # Service name:<br>- Service 2<br># App:<br>- App 2<br>#URL:<br>- Y...n |
| Voice Call | Service Metric Profile 4 | # Service Metrics:<br>- Latency< y1ms<br>- Page load<= y2ms | # Service name:<br>- Service 3<br># App:<br>- App 3<br>#URL:<br>- Z...n |
| ... | ... | ... | ... |
| Type N | Profile N | Service Metrics N | Service Info N |

FIG. 7

| Deployment Configuration | | | Service Metrics Profile | Optimal Deployment profile |
| --- | --- | --- | --- | --- |
| Far Edge DC | Edge DC | Central DC | | |
| NF1 | | | Service Metric Profile 1 | Dep. Profile 1 |
| NF2 | | | | |
| NF3 | | | | |
| NF1 | NF2 | NF3 | Service Metric Profile 1 | Dep. Profile 2 |
| | | | | |

FIG. 9

SYSTEM, METHOD, AND COMPUTER PROGRAM FOR DYNAMIC SERVICE DEPLOYMENT

CROSS REFERENCE TO RELATED APPLICATIONS

This application is a National Stage of International Application No. PCT/US2022/051341 filed Nov. 30, 2022.

FIELD

Apparatuses and methods consistent with example embodiments of the present disclosure relate to managing deployment of one or more services and, more particularly, relate to apparatuses and methods for dynamically deploy one or more software-based services.

DESCRIPTION OF RELATED ART

Traditionally, telecommunication (telco) systems have been mainly hardware-based, namely, telco services were mainly provided in the form of hardware and were usually proprietary or managed by a specific vendor, a service provider, and/or a network operator.

Recently, the evolution of telco technologies enables the telco services to be provided in the form of software. For instance, radio access networks (RANs) such as Open RAN (O-RAN) architectures, disaggregate one network component into multiple functional elements. By way of example, a baseband unit (BBU) or base station is disaggregated into a number of functional elements including a distributed unit (DU) and a centralized unit (CU), wherein the CU can be further disaggregated into Centralized Unit-Control Plane (CU-CP) and Centralized Unit-User Plane (CU-UP). The disaggregation of network elements enables the telco services and the associated functions to be defined and provided in software-based form or virtual network services, such as Virtualized Network Functions (VNFs), Cloud-native Network Functions (CNFs) or Software Defined Networking (SDN), among others.

Accordingly, the software-based telco services may be deployed or hosted in, for example, a server cluster in one or more data centers (e.g., far edge data centers, edge data center, central data center, etc.). Further, software-based telco services may be deployed or hosted along with other non-telco services (e.g., enterprise software, business supporting applications, etc.). Nevertheless, it is required to further improve the deployment of software-based services, as discussed below.

Specifically, the service deployment operations, systems, and methods in the related art are essentially designed for deployment of non-telco services, and may not be as effective and efficient for deployment of telco services due to the high dynamic nature of telco services (which in turn results in frequent changes in requirements or demands of deployment configuration).

Particularly, in the related art, the deployment configuration of a service (e.g., how to deploy the service, where to deploy the service, etc.) is manually decided by a system operator (e.g., network operator) based on, for example, service requirements provided by the associated service provider. For instance, the network operator may perform a one-time determination on an optimal deployment configuration for deploying the service. The aforesaid deployment approach or process may be suitable for deploying services (such as web-scalers, etc.) of which the deployment configuration does not vary frequently, but may not be efficient and effective for deploying telco services due to the high dynamic nature of the telco services.

For instance, end users of the telco services may have a first demand for a first service performance (e.g., low network latency, etc.) at one time period, and may have a second demand for another service performance (e.g., high network throughput, etc.) at another time period. Thus, an optimal deployment configuration determined at one time period may not necessarily remain optimal at another time period.

FIG. 1 illustrates an example block diagram of a simplified system 100 in which a service is deployed according to a deployment configuration in the related art. Referring to FIG. 1, a network 101 managed by a network operator may comprise: a cell site 102, a far edge datacenter (DC) 103, an edge DC 104, and a central DC 105. The network 101 may be communicatively coupled to an internet 106.

In this example use case, network function (NF) 1, NF2, and NF3 constitute a service, and are being deployed according to the following deployment configuration: deploy NF1 in a server of the far edge DC 103, deploy NF2 in a server of the edge DC 104, and deploy NF3 in a server of the central DC 105.

In operation, the cell site 102 (in which hardware such as antennas and the like are deployed) may interact with a user equipment of an end user, so as to transmit or exchange data packets to and from the internet 106 via NF1 to NF3. For instance, whenever the end user utilizes the service (e.g., by interacting with an application installed on the user equipment, etc.), a data packet may be generated and transmit toward a target destination in the internet 106. In this regard, the data packet may first be routed to the far edge DC 103 (in which NF1 is deployed), to the edge DC 104 (in which NF2 is deployed), and then to central DC 105 (in which NF3 is deployed), before being routed to the target destination in internet 106. Similar processes may occurs when a data packet is provided to the user equipment via the internet 106.

The deployment configuration illustrated in FIG. 1 may be determined by the network operator as the most optimal deployment configuration in providing a specific performance or in fulfilling a specific service metric when initially deploying NF1, NF2, and NF3. Assuming that said deployment configuration is configured by the network operator to provide the highest possible network throughput, said deployment configuration may be considered as "optimal" when the end users of the service require or demand high network throughput in the service performance. Nevertheless, whenever the demand of the end users changes (e.g., when the end users would like to prioritize low network latency performance instead of high network throughput performance), said deployment configuration may no longer be optimal since the deployment configuration is not determined based on the new demand and may not necessarily provide optimal service performance as per the new demand. Further, end users with different demands on a service performance(s) may frequently move around from one cell to another, which in turns increase the irregularity and intermittency of requirement or demand on the deployment configuration of services.

In this regard, in the related art, the network operator may, in response to a request or a complaint from an end user(s), manually determine a new optimal deployment configuration for a service and manually changes the deployment of the service accordingly. For instance, in the example use case illustrated in FIG. 1 (of which the deployment configuration is assumed to be determined to provide a high network throughput performance), whenever the end users demand for a low latency performance on the service, the end users may contact the network operator (via sending an email, making a telephone call, creating a ticket, etc.) to request the network operator to improve the low latency performance of the service or raise a complain to the network operator about the poor latency performance of the service. Subsequently, the network operator may need to manually handle the correspondences from the end users, to manually determine a new optimal deployment configuration based on the users' new request or demand on the service performance, and to manually update the deployment (or redeploy) NF1-NF3 according to the new optimal deployment configuration, so as to cater the users' new request or demand.

In view of the above, the process of managing the deployment of the service in the related art is inefficient and ineffective in responding to frequently changes in requirement or demand of deployment configuration in telco services.

For instance, in the related art, the associated processes (e.g., the process of end users raising new request or demand to the network operator, the process of the network operator determining a new optimal deployment configuration for a service, the process of the network operator deploying the service according to the new optimal deployment configuration, etc.) may take a long turn-around time, which may not be effective in responding to an urgent request or demand (e.g., the end users would like to have the service to quickly switch from "high network throughput" performance to "low network latency" performance, etc.).

Further, said associated processes in the related art are also inefficient and ineffective in addressing the frequently changing demands of the end users (e.g., the end users would like to utilize the service to have "low latency" performance for 1 hour, would like to utilize the service to have "high data throughput" performance for the subsequent 1 hour, and then would like to utilize the service to again have "low latency" performance for another 1 hour, etc.). In that case, it will be burdensome and costly (in terms of time, human resources, costs, etc.) for the network operator to manually manage the deployment of services.

SUMMARY

According to embodiments, apparatuses, methods, and devices are provided for automatically and dynamically determining an optimal deployment configuration for one or more services, and to automatically and dynamically mange the deployment of the one or more services according to the optimal deployment configuration. Accordingly, example embodiments of the present disclosures are suitable for managing deployment of services which has high dynamic nature in the demand or requirements of deployment configuration (regardless of the services being non-telco services or telco services). Further, the example embodiments of the present disclosure reduce the end user's and network operator's burden in managing the service deployment, are efficient and effective in quickly responding and fulfilling changes in the end user's demand on one or more service performances and ensure that the deployment configuration of the service is always optimal so that the service performance can always cater to end user's requirement and thereby improving the end user's experience.

According to embodiments, an apparatus includes: a memory storing instructions; and at least one processor configured to execute the instructions to: receive information associated with a service; determine, based on the received information, an optimal deployment configuration; determine whether or not the service is required to be deployed according to the optimal deployment configuration; and based on determining that the service is required to be deployed according to the optimal deployment configuration, output information defining an action for deploying the service according to the optimal deployment configuration.

The action for deploying the service may include an action to store the service in a local cache of a server. Further, the action for deploying the service may include an action to temporary deploy the service in a server for a predetermined period of time.

The at least one processor may be configured to execute the instructions to determine the optimal deployment configuration by: determining, based on the received information, one or more service metrics associated with the service, wherein the one or more service metrics define a minimal service performance requirement; determining, based on the one or more service metrics, one or more optimal deployment profiles; and determining, based on the one or more optimal deployment profiles, the optimal deployment configuration.

The at least one processor may be configured to execute the instructions to determine the one or more service metrics by: determining, based on the received information, one or more identities (IDs) of one or more service metric profiles; obtaining, based on the one or more IDs, the one or more service metric profiles; and determining, based on the obtained one or more service metric profiles, the one or more service metrics.

The at least one processor may be configured to execute the instructions to determine the one or more optimal deployment profiles by: instantiating, based on a plurality of deployment configuration, one or more virtual agents associated with the service; selecting, based on the one or more service metrics, one or more deployment configurations from the plurality of deployment configurations; and generating, based on the selected one or more deployment configurations, the one or more optimal deployment profiles.

The at least one processor may be configured to execute the instructions to determine the optimal deployment configuration by: receiving information associated with one or more servers; determining, based on the information associated with the one or more servers, an applicable optimal deployment profile from the one or more optimal deployment profiles; and determining that the deployment configuration defined in the applicable optimal deployment profile is the optimal deployment configuration.

According to embodiments, a method, performed by at least one processor, includes: receiving information associated with a service; determining, based on the received information, an optimal deployment configuration; determining whether or not the service is required to be deployed according to the optimal deployment configuration; and based on determining that the service is required to be deployed according to the optimal deployment configuration, outputting information defining an action for deploying the service according to the optimal deployment configuration.

The action for deploying the service may include an action to store the service in a local cache of a server. Further, the action for deploying the service may include an action to temporary deploy the service in a server for a predetermined period of time.

The determining of the optimal deployment configuration may include: determining, based on the received information, one or more service metrics associated with the service, wherein the one or more service metrics define a minimal service performance requirement; determining, based on the one or more service metrics, one or more optimal deployment profiles; and determining, based on the one or more optimal deployment profiles, the optimal deployment configuration.

The determining of the one or more service metrics may include: determining, based on the received information, one or more identities (IDs) of one or more service metric profiles; obtaining, based on the one or more IDs, the one or more service metric profiles; and determining, based on the obtained one or more service metric profiles, the one or more service metrics.

The determining of the one or more optimal deployment profiles may include: instantiating, based on a plurality of deployment configuration, one or more virtual agents associated with the service; selecting, based on the one or more service metrics, one or more deployment configurations from the plurality of deployment configurations; and generating, based on the selected one or more deployment configurations, the one or more optimal deployment profiles.

The determining of the optimal deployment configuration may include: receiving information associated with one or more servers; determining, based on the information associated with the one or more servers, an applicable optimal deployment profile from the one or more optimal deployment profiles; and determining that the deployment configuration defined in the applicable optimal deployment profile is the optimal deployment configuration.

According to embodiments, a non-transitory computer-readable recording medium having recorded thereon instructions executable by a processor to cause the processor to perform a method including: receiving information associated with a service; determining, based on the received information, an optimal deployment configuration; determining whether or not the service is required to be deployed according to the optimal deployment configuration; and based on determining that the service is required to be deployed according to the optimal deployment configuration, outputting information defining an action for deploying the service according to the optimal deployment configuration.

The action for deploying the service may include an action to store the service in a local cache of a server. Further, the action for deploying the service may include an action to temporary deploy the service in a server for a predetermined period of time.

The non-transitory computer-readable recording medium may have recorded thereon instructions executable by at least one processor to cause the at least one processor to perform the method, in which the determining of the optimal deployment configuration may include: determining, based on the received information, one or more service metrics associated with the service, wherein the one or more service metrics define a minimal service performance requirement; determining, based on the one or more service metrics, one or more optimal deployment profiles; and determining, based on the one or more optimal deployment profiles, the optimal deployment configuration.

The non-transitory computer-readable recording medium may have recorded thereon instructions executable by at least one processor to cause the at least one processor to perform the method, in which the determining of the one or more service metrics may include: determining, based on the received information, one or more identities (IDs) of one or more service metric profiles; obtaining, based on the one or more IDs, the one or more service metric profiles; and determining, based on the obtained one or more service metric profiles, the one or more service metrics.

The non-transitory computer-readable recording medium may have recorded thereon instructions executable by at least one processor to cause the at least one processor to perform the method, in which the determining of the one or more optimal deployment profiles may include: instantiating, based on a plurality of deployment configuration, one or more virtual agents associated with the service; selecting, based on the one or more service metrics, one or more deployment configurations from the plurality of deployment configurations; and generating, based on the selected one or more deployment configurations, the one or more optimal deployment profiles.

The non-transitory computer-readable recording medium may have recorded thereon instructions executable by at least one processor to cause the at least one processor to perform the method, in which the determining of the optimal deployment configuration may include: receiving information associated with one or more servers; determining, based on the information associated with the one or more servers, an applicable optimal deployment profile from the one or more optimal deployment profiles; and determining that the deployment configuration defined in the applicable optimal deployment profile is the optimal deployment configuration.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 6 illustrates an example flow diagram of a method for determining one or more service metrics associated with a service;

FIG. 7 illustrates a table containing examples of service metric profiles, according to one or more embodiments;

FIG. 9 illustrate a table containing examples of optimal deployment profiles, according to one or more embodiments;

DETAILED DESCRIPTION

Figure 1:
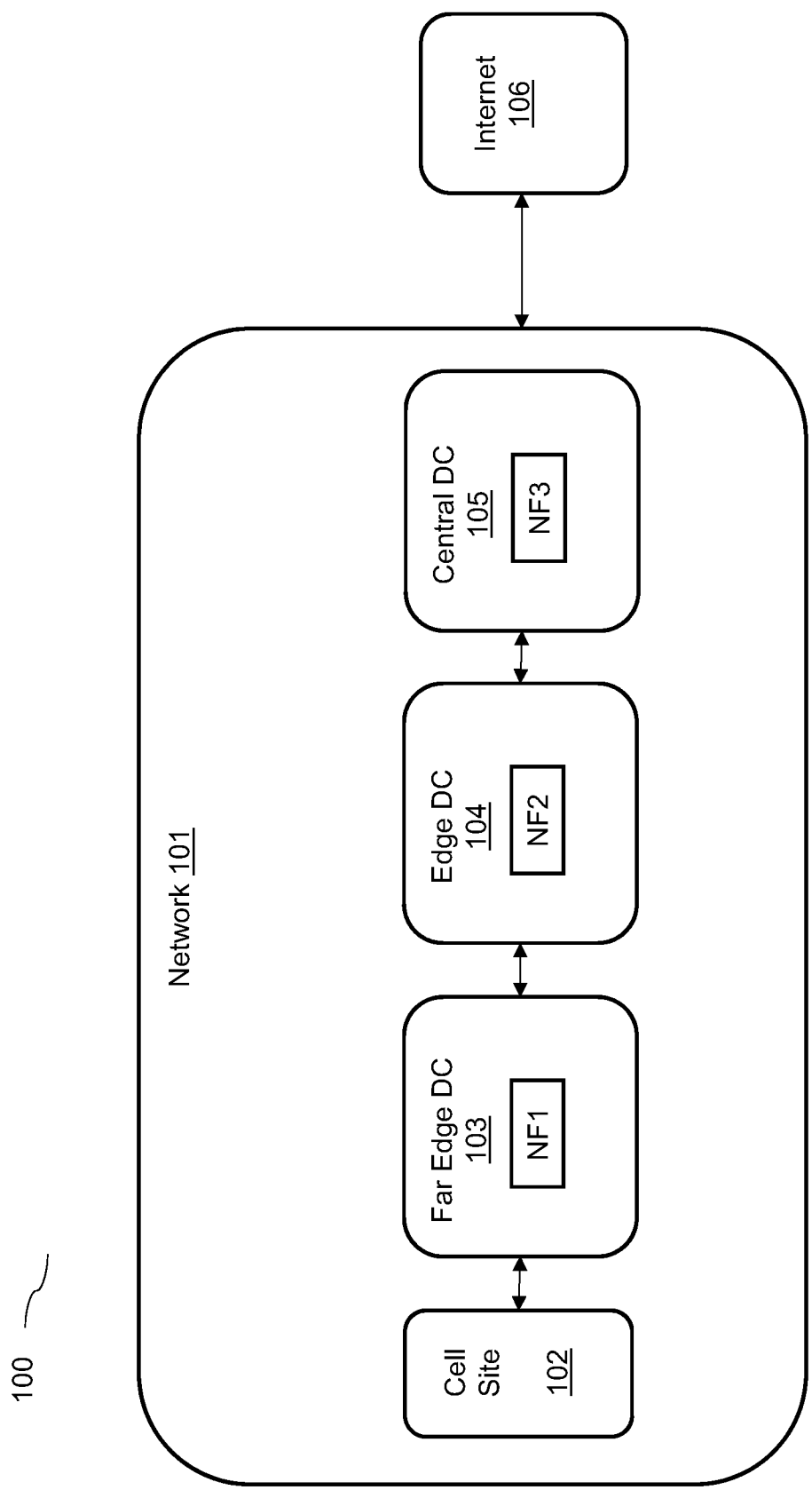
FIG. 1 illustrates an example block diagram of a simplified system in which a service is deployed according to a deployment configuration in the related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Further, although only one far edge data center (DC), one edge DC, and one central DC are described herein below, it is apparent that any other appropriate configuration may be applicable, without departing from the scope of the present disclosure. For instance, more than one far edge, more than one edge DC, and/or more than one central DC may be included in any of the example embodiments described herein. Alternatively, one or more of the far edge DC, the edge DC, and the central DC may be excluded in any of the example embodiments described herein.

Furthermore, the terms "service", "services", or the like as described herein is intended to encompass any software-based services, such as software-based telco services like virtualized network functions Virtualized Network Functions (VNFs), Cloud-native Network Functions (CNFs) or Software Defined Networking (SDN), as well as software based non-telco services like enterprise software, business supporting applications, and any other software applications or services that may experience high dynamic nature in deployment configurations and/or frequent changes in user's demand.

In addition, the phrases "service deployment", "deploying a service", or the like, is intended to encompass the deployment and/or redeployment of one or more components included in the associated service, such as one or more "network functions", one or more "network service", and the like. Accordingly, in the following, the deployment of a service may be described interchangeably with the deployment of a network function or a network service, unless being explicitly described otherwise.

Example embodiments of the present disclosures provide a system and method to automatically and dynamically determine an optimal deployment configuration for one or more services, and to automatically and dynamically mange the deployment of the one or more services according to the optimal deployment configuration. For instance, the system and method of the present disclosures may automatically analyze behavior or demand of a user associated with the one or more services and determine the optimal deployment configuration based thereon, and then dynamically manage the deployment of the one or more services in real-time or near real-time.

Accordingly, example embodiments of the present disclosures are suitable for managing deployment of services which has high dynamic nature in the demand or requirements of deployment configuration (regardless of the services being non-telco services or telco services). Further, the example embodiments of the present disclosure reduce the end user's and network operator's burden in managing the service deployment, are efficient and effective in quickly responding and fulfilling changes in the end user's demand on one or more service performances and ensure that the deployment configuration of the service is always optimal so that the service performance can always cater to end user's requirement and thereby improving the end user's experience.

Figure 2:
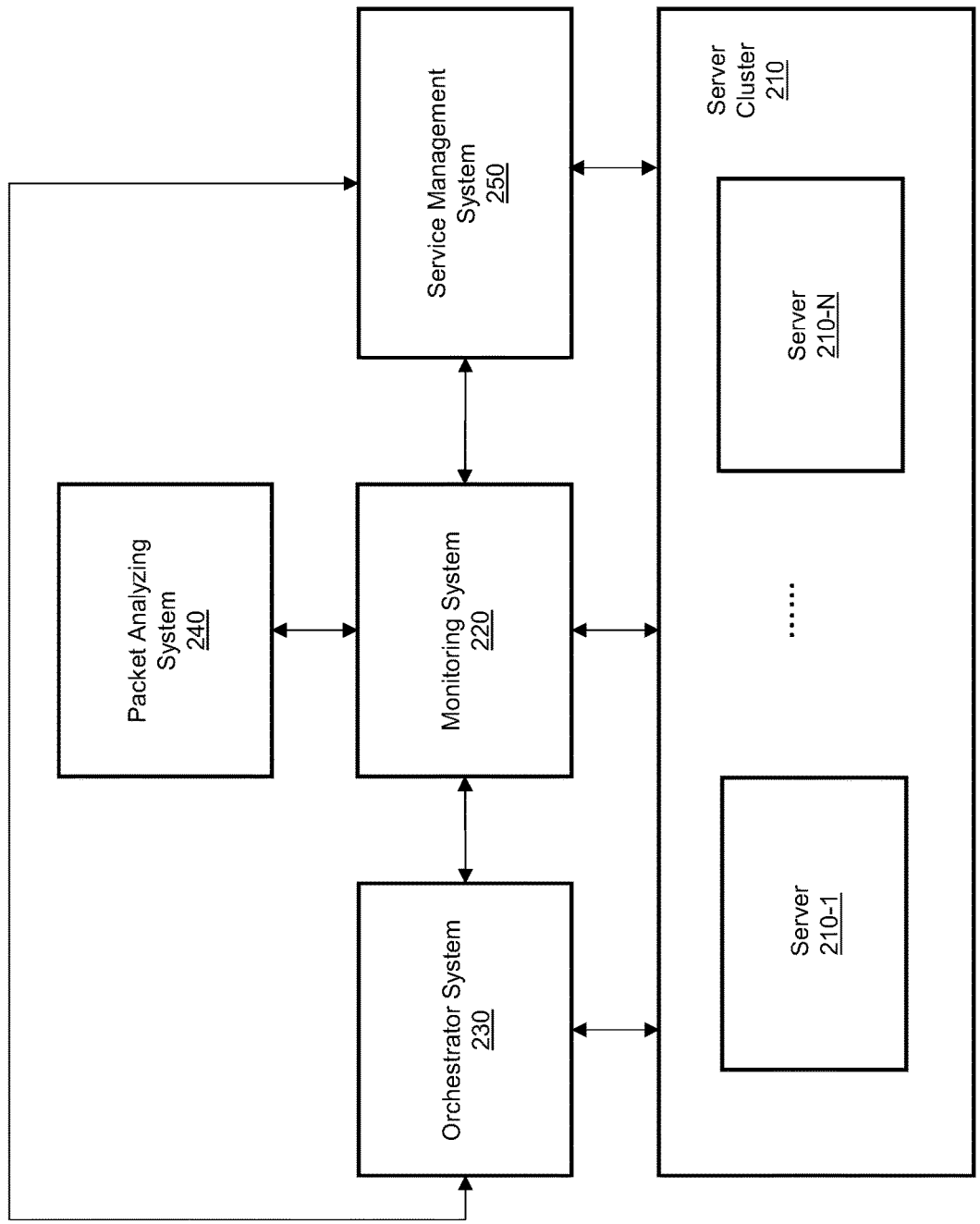
FIG. 2 illustrates a block diagram of a system for managing deployment of one or more services, according to one or more embodiments.

FIG. 2 illustrates a block diagram of a system 200 for managing deployment of one or more services, according to one or more embodiments. Referring to FIG. 2, the system 200 may include a server cluster 210, a monitoring system 220, an orchestrator system 230, a packet analyzing system 240, and a service management system 250.

As illustrated in FIG. 2, the server cluster 210 may be communicatively coupled to the monitoring system 220, the orchestrator 230, and the service management system 250. Further, it is contemplated that the server cluster 210 may also be communicatively coupled to the packet analyzing system 240 (e.g., the packet analyzing system 240 may be configured to interface between the server cluster 210 and an external network like an internet, the server cluster 210 may be communicatively coupled to the packet analyzing system 240 via monitoring system 220, etc.).

Further, the server cluster 210 may include a plurality of servers (referred to as "servers 210-1" hereinafter), each of which is hosting or deploying (or is configured to host or deploy) a plurality of services. Furthermore, the servers 210-1 may be distributedly deployed in a plurality of data centers (DCs). For instance, a portion of the servers 210-1 may be deployed in a first DC, and the remaining portion of the servers 210-1 may be deployed in a second DC. The DCs may include: one or more far edge DC, one or more edge DC, and/or one or more central DC. Further still, the servers 210-1 may include one or more public cloud servers, one or more private cloud servers, one or more dedicated cloud servers, one or more hybrid cloud servers, or any suitable commercial-off-the-shelf (COTS) server.

Referring still to FIG. 2, the monitoring system 220 may be communicatively coupled to the server cluster 210, the orchestrator system 230, the packet analyzing system 240, and the service management system 250.

In some embodiments, the monitoring system 220 may be configured to continuously (or periodically) monitor and collect telemetry data (e.g., via API calls) from the server cluster 210, from the orchestrator system 230, from the packet analyzing system 240, and/or from the service management system 250. For instance, the monitoring system 220 may be configured to collect status data (e.g., resource status, health status, etc.) of one or more of the servers 210-1 in the server cluster 210 and provide the status data to the orchestrator system 230 for further processing. Similarly, the monitoring system 220 may be configured to collect data from the orchestrator system 230, the packet analyzing system 240, and the service management system 240, and to provide the collected data to each other and/or to the server cluster 210 when required. For instance, the monitoring system 220 may be configured to receive, from the packet analyzing system 240, information of data packets associated with one or more services, and to provide said information to the orchestrator system 230 for further processing.

In some embodiments, the monitoring system 220 may comprise an observability framework which may be configured to provide continuous (or periodical) network observability. For instance, the observability framework may be configured to collect logs, metrics, and/or traces associated with one or more of the server cluster 210 (and the data center(s) or server(s) associated therewith), the orchestrator system 230, the packet analyzing system 240, and the service management system 250, and thereby provides comprehensive insights thereof. In this regard, the monitoring system 220 may be configured to monitor and collect, in real-time or near real-time, status data (e.g., health status, status of available hardware resources, etc.) of each of the servers 210-1 (and the data center(s) associated therewith), logs of services deployment in each of the servers 210-1 (and the data center(s) associated therewith), traces of the operations of services deployment performed by the service management system 250, and any other suitable data or information which provides informative insights on the status, activity, and performance of the system.

Referring still to FIG. 2, the orchestrator system 230 may be communicatively coupled to the monitoring system 220, the server cluster 210, and the service management system 250. Further, the orchestrator system 230 may be communicatively coupled to the packet analyzing system 240 via the monitoring system 220.

In some embodiments, the orchestrator system 230 may be configured to receive information of one or more services (e.g., service name, service statistics, end users' behavior on the service, etc.). The information of the one or more services may be provided to the orchestrator system 230 from another system or module, such as from the packet analyzing system 240 (via monitoring system 220), in real-time or near real-time.

Further, the orchestrator system 230 may include an internal storage medium (e.g., local memory storage, etc.) storing one or more service metric profiles. The one or more service metric profiles may contain one or more service metrics defining a minimum service performance requirement predetermined by a system admin (e.g., a network operator, etc.).

In this regard, the orchestrator system 230 may be configured to determine, based on the one or more service metric profiles associated with a service and the received information of the service, an optimal deployment configuration for the service. Further, the orchestrator system 230 may be configured to determine whether or not a deployment of the service according to the optimal deployment configuration is required. Subsequently, based on determining that the deployment of the service according to the optimal deployment configuration is required, the orchestrator system 230 may be configured to deploy the service (e.g., by outputting information defining an action for deploying the service, etc.) according to the optimal deployment configuration. Alternatively, based on determining that the deployment of the service according to the optimal deployment profiles is not required, the orchestrator system 230 may be configured to iteratively or periodically repeat the aforementioned processes. In this way, the orchestrator system 230 may dynamically determine the optimal deployment configuration for the service in real-time or near real-time, and may dynamically deploy the service according to the optimal deployment configuration when required.

In some embodiments, the orchestrator system 230 may be configured to generate or determine one or more optimal deployment profiles for a service, based on one or more service metric profiles associated with the service and the received information of the service. The one or more optimal deployment profiles may contains one or more deployment configurations which may theoretically fulfill or exceed the minimal service performance requirement defined by the one or more service metric profiles. Further, upon detecting one or more changes in the one or more service metric profiles (e.g., one or more service metrics have been revised, new service metric profile is added, etc.) and/or upon detecting a breach of the one or more service metric profiles (e.g., service performance degraded due to server failure, etc.), the orchestrator system 230 may be configured to update or reconfigure the one or more optimal deployment profiles according to service metric profile(s) that can be met (e.g., the one or more optimal deployment profiles are updated on a best efforts basis, the one or more optimal deployment profiles determined based on the actual system condition and/or the actual system capability to fulfill the minimum service requirement defined by the service metric profile(s), etc.).

In some embodiments, the orchestrator system 230 may comprise a service management and orchestration (SMO) platform complying with requirements defined by the Open Radio Access Network (O-RAN) Alliance. In some embodiments, the orchestrator system 130 may be configured to provide end-to-end automation in lifecycle management (e.g., on-boarding, instantiation, redeployment, healing, scaling, termination, etc.) of one or more services hosted or deployed in one or more of the servers 210-1.

Referring still to FIG. 2, the packet analyzing system 240 may be communicatively coupled to the monitoring system 220. Further, the packet analyzing system 240 may be interfacing one or more elements or modules of the system 200 and an external network (e.g., an internet, etc.), and may be configured to analyze data packets transmitted among system 200 and the external network. Specifically, the packet analyzing system 240 may be configured to perform operations (e.g., packet sniffing, packet inspection, etc.) to analyze and examine contents of data packets passing and exchanging between system 200 and the external network.

For instance, the packet analyzing system 240 may be configured to analyze (e.g., on a per session level, etc.) information of data packets exchanging between one or more servers 210-1 of the server cluster 110 and the external network. Accordingly, the packet analyzing system 240 may be configured to retract or compile information associated with one or more services deployed in the servers 210-1, such as: type of services being utilized by end users (e.g., web browsing, voice call, streaming, gaming, banking, etc.), title or descriptions of the services, statistics or usage patterns of the services (e.g., how many users in location X are using service A, which services have high demand on low latency performance, which services are being actively utilized, etc.), software application associated to the services (e.g., application installed on user equipment or hosted online to provide the services to the end users, etc.), Uniform Resource Locator (URL) associated with the services (e.g., URL specifying a location of a service content in the internet, etc.), session types (e.g., HTTP, HTTPS, etc.), and any other suitable information which may provide a comprehensive information and insight of one or more services and the behavior of the associated end users.

In some embodiments, the packet analyzing system 240 may comprise a deep packet inspection (DPI) engine which may be configured to perform deep packet inspection on one or more data packets passing to and from system 200. For instance, the DPI engine may be configured to analyze contents of packet header of a data packet (e.g., contents which indicate the type of associated service) and contents of payload of the data packet (e.g., contents which indicate details of the associated service) over a given session. One or more contents of the payload may be encrypted for security or privacy reasons, and said contents may remain encrypted during the deep packet inspection process performed by the DPI engine. In this way, the DPI engine may determine user's behavior (e.g., user's demand on service performance, etc.) on each service as per session level, while maintaining the security and privacy of the specific packet content.

Further, the packet analyzing system 240 may be configured to continuously or periodically provide the analyzed information associated with one or more services to the monitoring system 220 (e.g., via interval API calls) in real-time or near real-time, such that the monitoring system 220 may provide said information to the orchestrator system 230 and the orchestrator system 230 may utilize said information to timely determine updated optimal deployment profile(s) and/or updated optimal deployment configuration for the associated service when required.

Referring still to FIG. 2, the service management system 250 may be communicatively coupled to the server cluster 210, the monitoring system 220, and the orchestrator system 230.

In some embodiments, the service management system 250 may be configured to receive, from the orchestrator system 230, data or information defining an action for managing one or more services deployed or hosted in one or more servers 210-1 of the server cluster 210. Subsequently, the service management system 250 may be configured to perform the action to manage the one or more services accordingly. For instance, the service management system 250 may be configured to receive, from the orchestrator system 230, information defining an action to deploy (or redeploy) a service (or the associated elements such as network functions, network services, applications, etc.) according to an optimal deployment configuration, and the service management system 250 may be configured to thereby deploy the service (or the associated elements such as network functions, network services, applications, etc.) based on the optimal deployment configuration.

In some embodiments, the action to deploy the service may include storing the service (or the or the associated elements such as network functions, network services, applications, etc.) in a local cache of a server, and/or temporarily deploying the service (or the or the associated elements such as network functions, network services, applications, etc.) on the server for a period of time.

In addition, the network management system 250 may be configured to perform one or more of: fault management operation, configuration management operation, account management operation, performance management operation, and security management operation (FCAPS operations), on one or more services hosted or deployed in the servers 210-1. Further, the network management system 250 may include an operational support system (OSS) and an element management system (EMS), each of which is configurable to perform one or more of the FCAPS operations. In some embodiments, the service management system 250 may include a plurality of EMSs, each of the plurality of EMSs may be configured to manage a single service or a group of services associated with a particular vendor/service provider, and the OSS interfaces between the monitoring system 220, orchestrator 230, and the plurality of EMSs. Accordingly, the service management system 250 may provide a single control point for managing a plurality of services (associated with multiple vendors/network service providers) via only one monitoring system and one orchestrator system (i.e., one monitoring system and one orchestrator system can be utilized to manage services associated with multiple vendors/service providers).

Figure 3:
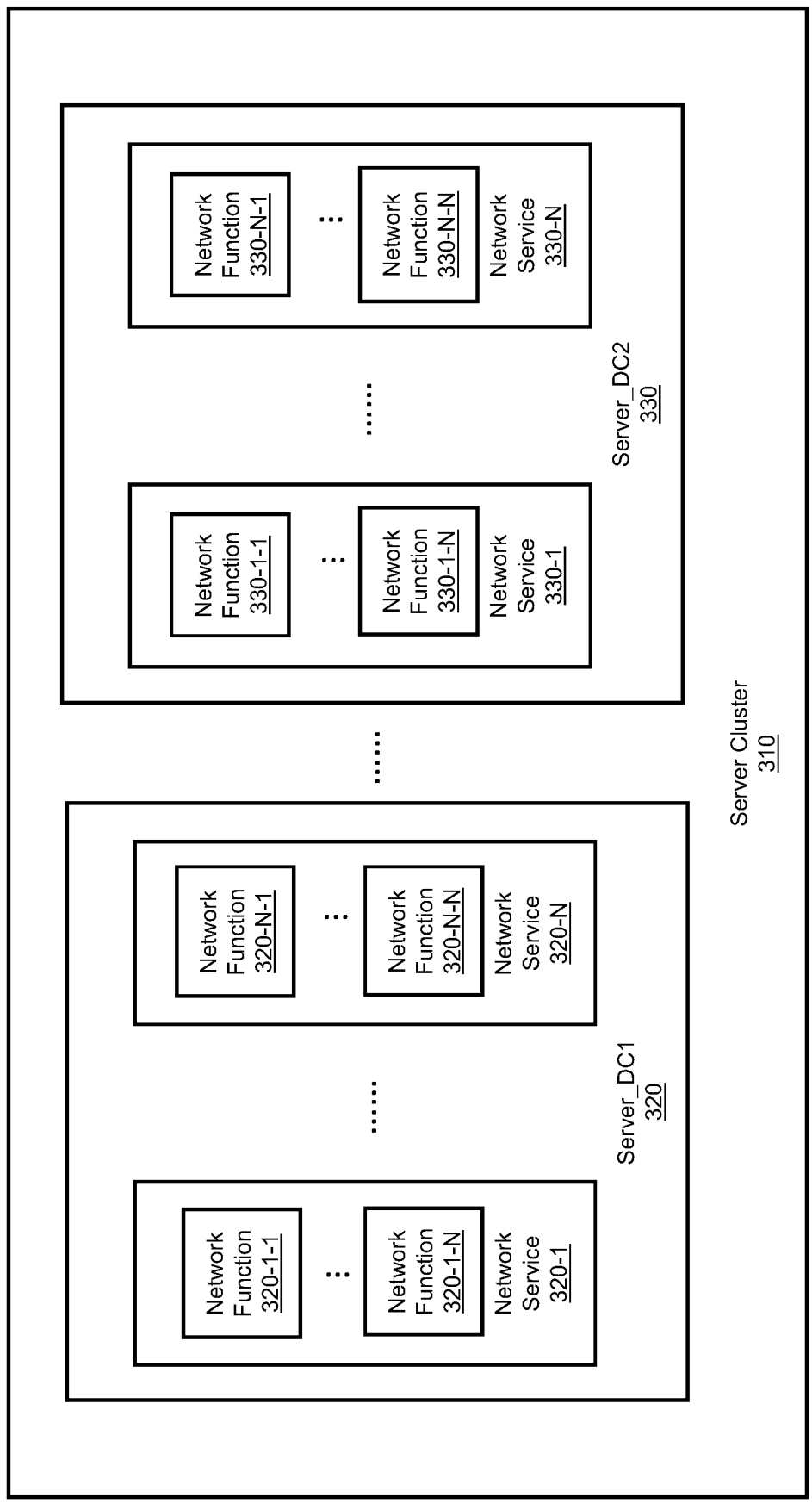
FIG. 3. illustrates an example block diagram of a server cluster for deploying one or more services, according to one or more embodiments.

FIG. 3. illustrates an example block diagram of a server cluster 310 for deploying one or more services, according to one or more embodiments. Server cluster 310 may correspond to server cluster 210 in FIG. 2, thus operations and descriptions described above in relation to server cluster 210 may be similarly applicable to server cluster 310, unless being explicitly described otherwise.

Referring to FIG. 3, the server cluster 310 may comprise a plurality of servers. In this example embodiment, server cluster 310 comprises two servers, i.e., one server 320 deployed in a first data center 1 (illustrated as "Server_DC1" in FIG. 3) and another server 330 deployed in a second data center 2 (illustrated as "Server_DC2" in FIG. 3). It is contemplated that the server cluster 310 may comprise more than one server in data center 1, may comprise more than one server in data center 2, and may comprise additional servers deployed in additional data center (e.g., a third datacenter, etc.), without departing from the scope of the present disclosure.

Each of the server 320 and server 330 may comprise computer resources (e.g., storage hardware, processing unit, memory, input/output chipset, etc.) and may be configured to deploy or host a plurality of services. The plurality of services may include, but is not limited to, one or more software-based telco services. Each of the services may be constituted from one or more network services (NSs) 320-1/330-1, wherein each of the one or more network services may further include one or more network functions (NFs) 320-1-1/330-1-1. It is contemplated that the descriptions associated with a service provided herein may be similarly applicable to one or more NSs and/or one or more NFs associated therewith (e.g., deployment of a service may include deployment of one or more NSs and/or one or more NFs associated with the service, etc.), unless being explicitly described otherwise.

In some embodiments, one or more of the plurality of services may be deployed and be provided in the form of, but not limited to, infrastructure as a service (IaaS), platform as a service (PaaS), Software as a Service (SaaS), and function as a service (FaaS). Further, a portion of the network functions 320-1-1 and/or a portion of the network services 320-1 may be provided by multiple vendors or multiple service providers. For instance, a network function A of network service A may be provided by a vendor A, and a network function B of the same network service A may be provided by a vendor B. Similarly, a network service B hosted or deployed within the server 320 may be provided by a vendor C, and another network service C hosted or deployed within the same server 320 may be provided by a vendor D.

Further, the NSs and/or the NFs of one service may be distributedly deployed or hosted in a plurality of servers in a plurality of datacenters. For instance, network service 320-1 and network service 330-1 may both be the NSs of the same service, while each of the network service 320-1 and the network service 330-1 may be hosted or deployed in server 320 (i.e., server in the first datacenter 1) and server 330 (i.e., server in the second datacenter 2), respectively. Furthermore, the plurality of datacenters may locate at a plurality of locations. For instance, the first datacenter 1 may be a far edge datacenter located at a location closer to the end users, while the second datacenter 2 may be a central datacenter located a location further from the end users. It is contemplated that more the NSs and/or the NFs of one service may be hosted or deployed in a plurality of servers in more than two datacenters as illustrated in FIG. 3. For instance, NSs and/or NFs of one service may be hosted or deployed in a plurality of servers in three datacenters (e.g., a far edge datacenter, an edge datacenter, and a central datacenter), and the like.

Furthermore, a portion of the NFs 320-1-1 and/or a portion of the NSs 320-1 may be virtualized and may be deployed or hosted in a form of virtualized machines (VMs). In this regard, each of the server 320 and the server 330 may comprise one or more hypervisors interfacing the hardware resources and the virtualized network functions and/or virtualized network services, so as to manage the utilization of hardware resources to operate the virtualized network functions and/or virtualized network services. The one or more hypervisors may be hardware-based, software-based, or firmware-based.

Further still, the server 320 and/or the server 330 may be a Kubernetes (K8s) based server, and a portion of the NFs 220-1-1 and/or a portion of the NSs 220-1 deployed or hosted therein may be containerized. For instance, a network function may be provided in a form of a container, and a plurality of containerized network functions may be deployed or hosted in a pod to thereby form a microservice. To this end, a plurality of microservices may form a containerized network service.

In some embodiments, one or more services deployed or hosted in the server cluster 310 may be software-based (e.g., virtualized, containerized, etc.), and may comprise one or more LTE-based telecommunication services, such as: a software-based radio unit (RU) (e.g., implementing at least some function of the RU), a software-based distribution unit (DU), a software-based centralized (or central) unit (CU), a software-based near real-time radio intelligent controller (near RT-RIC), a software-based mobile management entity (MME), a software-based serving gateway (SGW), a software-based packet data network gateway (PGW), and a software-based policy and charging rules function (PCRF). Further, the one or more service may also comprise one or more 5G-based telecommunication services, such as: a software-based access and mobility management function (AMF), a software-based session management function (SMF), a software-based policy control function, and a software-based user plane function (UPF). It is contemplated that the one or more services may include any other suitable services of any suitable technologies which may be hosted or deployed in software form.

Figure 4:
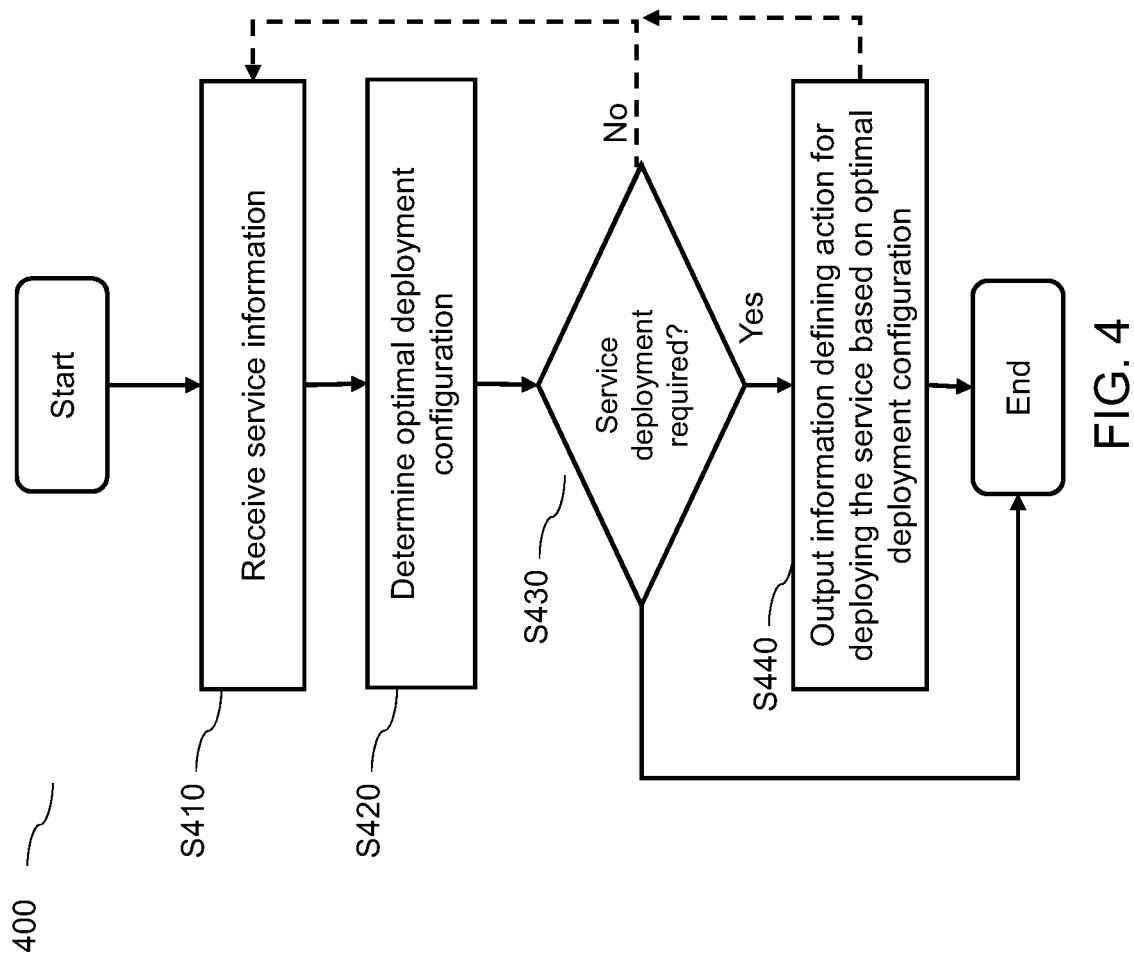
FIG. 4 illustrates an example flow diagram of a method for managing deployment of a service, according to one or more embodiments.

FIG. 4 illustrates an example flow diagram of a method 400 for managing deployment of one or more service, according to one or more embodiments. One or more operations of method 400 may be performed by orchestrator system 230 in FIG. 2.

Referring to FIG. 4, at operation S410, information associated with a service may be received. Specifically, the orchestrator system 230 may be configured to receive information associated with the service (referred to as "service information" hereinafter) from the monitoring system 220, wherein said service information may be provided by packet analyzing system 240 to the monitoring system 220. For instance, the service information may be generated or produced by the packet analyzing system 240 via processing (e.g., performing packet sniffing, performing deep packet inspection, etc.) one or more data packets associated with the service when said one or more data packets passing by and transmitting across the internal network (in which the service is hosted and deployed) and the external network (e.g., an internet, etc.). Subsequently, said service information may be provided by the packet analyzing system 240 to the monitoring system 220 (via API calls). To this end, whenever the monitoring system 220 receives service information (e.g., a new service information, an updated service information, etc.) from the packet analyzing system 240, the monitoring system 220 may notify the orchestrator system 230 and the orchestrator system 230 may then be configured to query the monitoring system 220 to request and receive said service information. The service information may comprise: service name, service type, usage pattern, user's demand statistic, and any other information which may provide a comprehensive insight of the service and the associated user's behavior.

At operation S420, an optimal deployment configuration may be determined. Specifically, the orchestrator system 230 may be configured to process the service information (received at operation S410, etc.) to determine the optimal deployment configuration. The optimal deployment configuration may define the most applicable optimal deployment configuration, which may fulfill or exceed a minimal service performance requirement. Details of the operations associated with the optimal deployment configuration are further described below with reference to FIG. 5 to FIG. 10.

At operation S430, a requirement for deploying the service may be determined. Specifically, the orchestrator system 230 may be configured to determine whether or not it is required or is preferable to deploy the service according to the determined optimal deployment configuration. For instance, the orchestrator system 230 may be configured to determine whether or not the existing or current deployment configuration of the service is optimal by, for example, comparing the current deployment configuration with the optimal deployment configuration determined at operation S420. Accordingly, based on determining that the current deployment configuration is the same with or is having a percentage of similarity with the determined optimal deployment configuration, the orchestrator system 230 may determine that the current deployment configuration is already optimal and may then determine that the deployment of the service according to the determined optimal deployment configuration is not required. Otherwise, based on determining that the current deployment configuration is not the same with or is having a percentage of differences with the determined optimal deployment configuration, the orchestrator system 230 may determine that the current deployment configuration is not optimal and may then determine that the redeployment of the service is required.

Based on determining that the redeployment of the service is not required, the process may end. In that case, the above described operations S410 to S430 may be initiated again only when new service information is received by the orchestrator system 230 (e.g., when the packet analyzing system 240 detects changes in the service and provides updated service information, etc.). Alternatively, instead of ending the process, the process may return to operation S410, such that the orchestrator system 230 may iteratively or continuously repeat operations S410 to S430.

On the other hand, based on determining that the redeployment of the service is required, the process proceeds to operation S440, at which the orchestrator system 230 may be configured to output information defining an action for deploying the service based on the determined optimal deployment configuration. Specifically, the orchestrator system 230 may generate and output an instruction message (comprising information of the determined optimal deployment configuration) to the service management system 250, such that the service management system 250 may be configured to deploy the service in a target server (e.g., one of the servers 210-1 in cluster 210) according to the instruction message and the determined optimal deployment configuration included therein. In some embodiments, the action for deploying the service may comprise an action to store the service in a local cache of the target server, and/or an action to temporarily deploy the service in the target server for a predetermined period of time. Once the deployment process at operation S440 is completed, the service management system 250 may provide a notification (e.g., an acknowledgement message, a reporting message, etc.) to the orchestrator system 230. Accordingly, the process may end, or may return to operation S410 such that the orchestrator system 230 may iteratively or continuously repeat operations S410 to S430.

Figure 5:
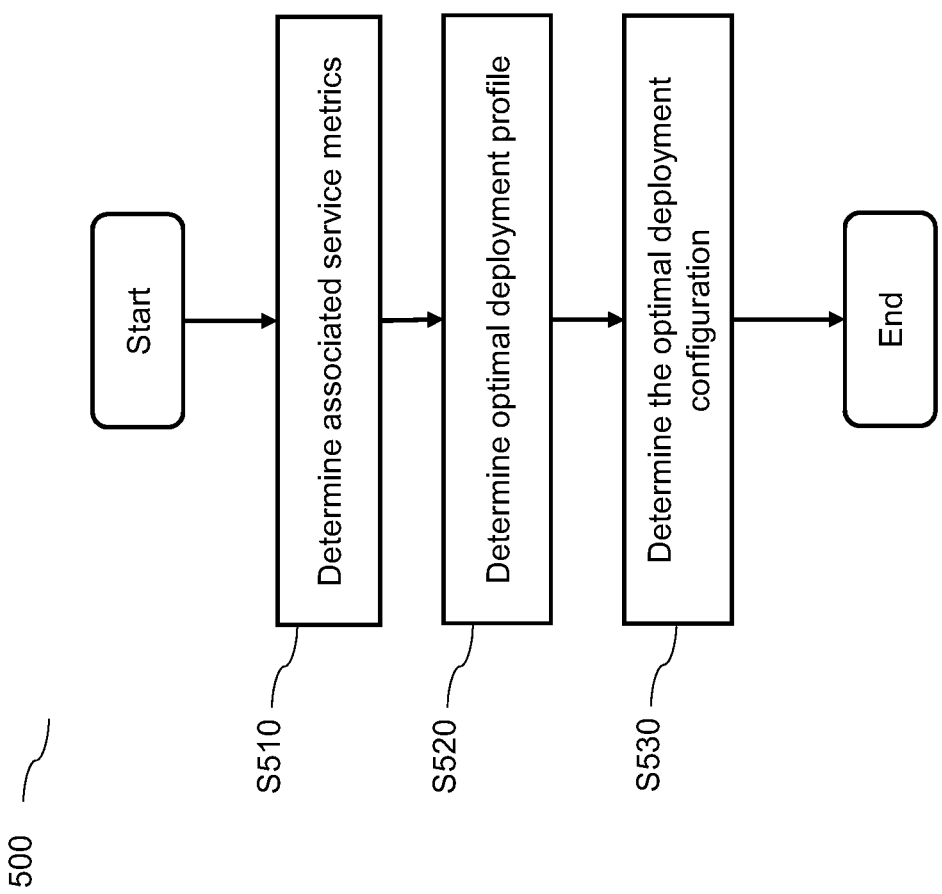
FIG. 5 illustrates an example flow diagram of a method for determining an optimal deployment configuration, according to one or more embodiments.

FIG. 5 illustrates an example flow diagram of a method 500 for determining an optimal deployment configuration, according to one or more embodiments. Method 500 may be part of operation S420 in FIG. 4, and may be performed by the orchestrator system 230 in FIG. 2.

Referring to FIG. 5, at operation S510, one or more service metrics associated with the service (e.g., service described above in relation to FIG. 4) is determined. Specifically, the orchestrator system 230 may be configured to determine, based on the service information (e.g., received at operation S410 in FIG. 4, etc.), one or more service metrics associated with the service. Each of the service metrics may define a minimum requirement on a service performance (referred to as "minimum service performance requirement" herein), such as minimum latency performance, minimum page load, minimum throughput, and the like. Operations associated with the one or more service metrics are described below with reference to FIG. 6 to FIG. 7.

At operation S520, one or more optimal deployment profiles are determined. Specifically, the orchestrator system 230 may be configured to determine the one or more optimal deployment profiles based on the one or more service metrics. Each of the one or more optimal deployment profiles may define a possible deployment configuration which fulfill or exceeds the minimum service performance requirement defined by the one or more service metrics. Operations associated with the one or more optimal deployment profiles are provided in below with reference to FIG. 8 to FIG. 9.

At operation S530, the optimal deployment configuration is determined. Specifically, the orchestrator system 230 may be configured to determine the optimal deployment configuration based on the one or more optimal deployment profiles. For instance, the orchestrator system 230 may determine which of the one or more optimal deployment profiles is applicable or available, and may then determine the deployment configuration defined by the applicable optimal deployment profile as the optimal deployment configuration. The operations of determining the optimal deployment configuration based on the one or more optimal deployment profiles are described below with reference to FIG. 10.

FIG. 6 illustrates an example flow diagram of a method 600 for determining one or more service metrics, according to one or more embodiments. Method 600 may be part of operation S510 in FIG. 5, and may be performed by the orchestrator system 230 in FIG. 2.

Referring to FIG. 6, at operation S610, one or more service metric profile identifiers (IDs) may be determined. Specifically, the orchestrator system 230 may be configured to determine, based on the service information (e.g., received at operation S410 in FIG. 4, etc.), one or more IDs each of which is associated with one or more service metric profiles. In some embodiments, one or more contents of the service information (e.g., service type, service name, URL description, etc.) are mapped to the one or more service metric profile IDs by the system operator, and the orchestrator system 230 may be configured to determine the one or more service metric profile IDs by determining a mapping between the information of the service and the one or more IDs.

For instance, the orchestrator system 230 may determine a service type from the service information and determine which ID(s) is associated with service metric profile(s) that is mapped to said service type. Alternatively or additionally, the orchestrator system 230 may determine the service metric profile ID(s) based on other service information (e.g., service name, URL description, etc.) in a similar manner.

The one or more service metric profiles may comprise one or more service metrics, and each of the service metrics define a minimum service performance requirement. Further descriptions of the content of the one or more service metric profiles are provided below with reference to FIG. 7.

At operation S620, one or more service metric profiles are obtained. Specifically, the orchestrator system 230 may be configured to obtain the one or more service metric profiles based on the determined one or more service metric profile IDs. The one or more service metric profiles may be pre-stored in a local storage medium of the orchestrator system 230, and the orchestrator system 230 may be configured to retract the one or more service metric profiles from the local storage medium based on the determined one or more service metric profile IDs.

At operation S630, one or more service metrics are determined. Specifically, the orchestrator system 230 may be configured to obtain or retract the one or more service metrics from the one or more service metric profiles (obtained at operation S620). For instance, the orchestrator system 230 may be configured to determine, from the service information (e.g., received at operation S410 in FIG. 4, etc.), a change in user's demand or user's behavior associated with a service performance, and to obtain or retract one or more service metrics associated with the service performance from the one or more metric profiles.

By way of example, assuming that the service information comprises insight or information defining that the user's demand on the service performance has changed (or has a tendency to change) from "high throughput" to "low latency", the orchestrator system 230 may determine one or more service metrics associated with "latency" and "throughput", and may obtain or retract said one or more service metrics from the associated metric profile(s). In this way, the orchestrator system 230 may determine the optimal deployment configuration based on the one or more service metrics associated with "latency" and "throughput", such that the optimal deployment configuration may provide optimal latency performance while maintaining throughput performance. It is contemplated that the service metric(s) may also be determined and obtained via any other suitable operations or processes, without departing from the scope of the present disclosure.

FIG. 7 illustrates a table containing examples of service metric profiles, according to one or more embodiments. Referring to FIG. 7, a service metric profile may comprise service information such as: service type, service metric profile ID, service metrics, and service info (e.g., service name, application information, URL information, etc.).

The service type may define a nature or a category of the service (e.g., web browsing, voice call, interactive gaming, banking, LTE service, 5G service, etc.). Further, each of the service metrics may define a minimal service performance requirement (e.g., minimum latency, minimum page load, minimum throughput, etc.). Furthermore, the service name may include the title of the service, an ID of the service, and any other suitable information which may identify the service. The application information may include a name of an application associated with the service (e.g., application installed on a user equipment or deployed on an internet to provide the service to the end user, etc.), a description of the application, an ID of the application, and any other suitable information which may specify the application. The URL information may include a description of the URL, a URL link (e.g., link which may redirect the end users to a particular service resources such as website, video, and the like), a session description (e.g., hypertext communication transfer protocols such as http, https, etc.), and any other suitable information which may specify the URL associated with the service.

As illustrated in FIG. 7, one service type may have multiple service metric profiles mapped thereto, each of which may contain different service metrics. By way of example, a service type "web browsing" may have service metric profile 1, service metric profile 2, and service metric profile 3 mapped thereto. In this example embodiment, service metric profile 1 may contain a first set of service metrics (e.g., latency lower than x1 ms, page load lower than or equal to x2 ms, etc.) defining a first set of minimum service performance requirements and service information associated with a first service (e.g., "Service 1"). Further, service metric profile 2 may contain a second set of service metrics (e.g., latency lower than x3 ms, page load lower than or equal to x4 ms, etc.) defining a second set of minimum service performance requirements for the first service (i.e., one service may have two service metric profiles and two sets of minimum service performance requirements may be predefined for one service). Further, service metric profile 3 may contain a third set of service metrics (e.g., latency lower than x5 ms, page load lower than or equal to x6 ms, etc.) defining a third set of minimum service performance requirements and service information associated with a second service (e.g., "Service 2").

Furthermore, in this example embodiment, service metrics in service metric profile 1 may define a first preferred service performance requirement (e.g., service performance requirement for achieving low latency performance, etc.) for the first service and service metrics in service metric profile 2 may define a second preferred service performance requirement (e.g., service performance requirement for achieving low page load performance, etc.) for the first service. Alternatively, the service metrics in service metric profile 1 may define the most preferable service performance requirement (e.g., service performance requirement for achieving lowest possible latency performance, etc.) and the service metrics in service metric profile 2 may define the second most preferable service performance requirement (e.g., service performance requirement for achieving the second lowest possible latency performance, etc.).

On the other hand, one service type may also have only one service metric profile mapped thereto. By way of example, a service type "voice call" has only service metric profile 4 mapped thereto, which contain a fourth set of service metrics (e.g., latency lower than y1 ms, page load lower than or equal to y2 ms, etc.) and service information associated with a third service (e.g., "Service 3").

The one or more service metrics in the one or more service metric profiles may be predetermined or pre-configured by the system operator. For instance, the one or more service metrics may be determined by the system operator based on one or more service level agreements (SLAs) between the system operator and the end users, between the system operator and the service provider, and/or between the service provider and the end users. For instance, the one or more SLAs may define the minimum service performance of a service promised or agreed by the system operator, thus the system operator may configure the one or more service metrics according to the minimum service performance defined in the one or more SLAs so as to ensure that the minimum service performance would be delivered. Alternatively, the service metrics may also be determined by the system operator based on service requirement provided by the service provider. For instance, the service provider may provide a service specification defining the preferred service requirement, and the system operator may appropriate adjust the service metrics (e.g., with reduced or increased service performance requirement) based on, for example, available network resources, insights of user's demand on the service, and the like. Upon determining the service metrics, a corresponding service metric profile may be generated (e.g., by orchestrator system 230).

Further, the information or contents of the service metric profile may be configurable or adjustable by the system operator before, during, or after deployment of the associated service. At the meantime, the information or contents of the service metric profile may also be automatically configured or adjusted by the system (e.g., by orchestrator system 230).

It is contemplated that the information illustrated in FIG. 7 are merely examples of a possible embodiment of present disclosure, and more or less information may be included or excluded and/or the presentation of the information may be different, without departing from the scope of the present disclosure.

Figure 8:
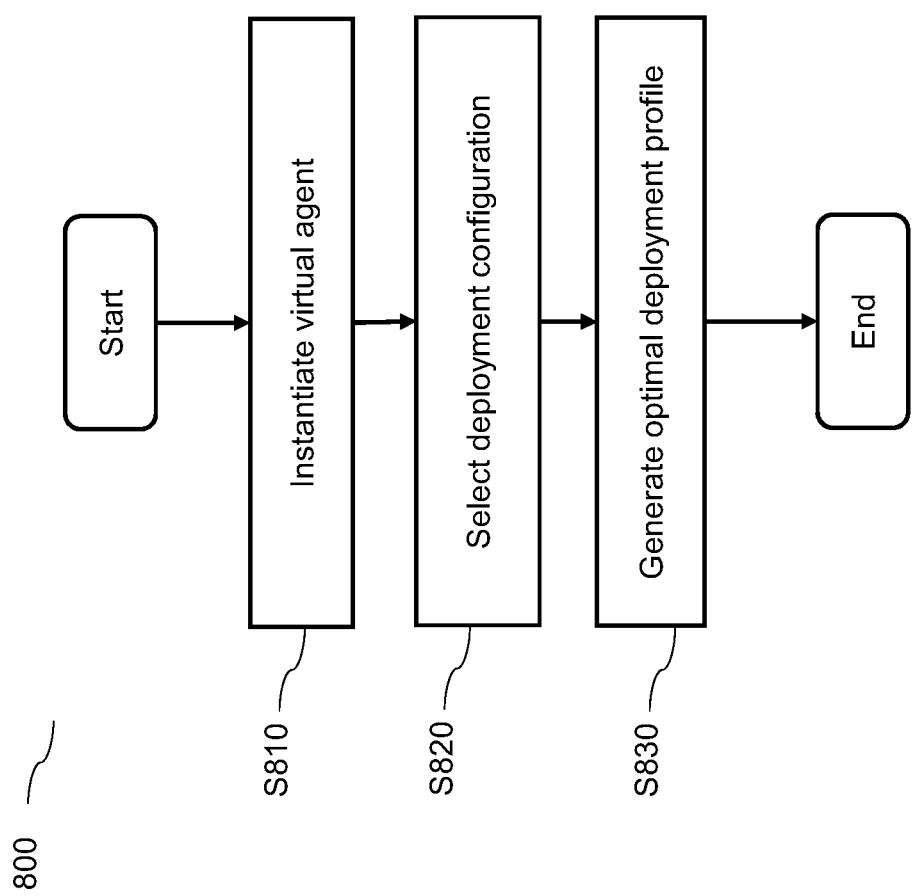
FIG. 8 illustrates an example flow diagram of a method for determining one or more optimal deployment profiles, according to one or more embodiments.

FIG. 8 illustrates an example flow diagram of a method 800 for determining one or more optimal deployment profiles, according to one or more embodiments. Method 800 may be part of operation S520 in FIG. 5, and may be performed by the orchestrator system 230 in FIG. 2.

Referring to FIG. 8, at operation S810, one or more virtual agents associated with the service (e.g., the service for which the one or more optimal deployment profiles are determined, etc.) may be instantiated. Specifically, each of the one or more virtual agents may be a replica of a corresponding network service (e.g., NS 320-1) or a replica of a corresponding network function (e.g., NF 320-1-1) of the service, and the instantiation of the virtual agents may comprise an operation of simulating the deployment of the one or more replica in one or more servers (e.g., servers 210-1, servers 320-330, etc.) to determine the performance of the service upon deployed on the one or more servers. The virtual agents may be generated (e.g., by copying the associated software coding, etc.) in runtime by the orchestrator system 230 based on the network function(s) or network service(c) of the service.

During the instantiation of the one or more virtual agents, the orchestrator system 320 may simulate the deployment of the virtual agents based on a plurality of possible deployment configurations, to estimate or determine the service performance under the plurality of possible deployment configurations, and to record said service performance.

By way of example, assuming that service 1 in FIG. 7 comprises three network functions (e.g., NF1, NF2, and NF3), and the virtual agents of service 1 (e.g., replicas of NF1, NF2, and NF3) are instantiated on three servers (e.g., a first server in a far edged DC, a second server in an edge DC, and a third server in central DC). In this regard, the orchestrator system 320 may be configured to deploy virtual agents of NF1-NF3 according to a first deployment configuration (e.g., deploying all virtual agents in the first server), to simulate a first performance test (e.g., ping test, packet downloading test, etc.) to estimate or determine the performance of the service under the first deployment configuration, and to record the results of the first performance test under the first deployment configuration. Subsequently, the orchestrator system 320 may be configured to deploy virtual agents of NF1-NF3 according to a second deployment configuration (e.g., deploying virtual agent of NF1 in the first server, deploying virtual agent of NF2 in the second server, and deploying virtual agent of NF3 in the third server, etc.), to simulate a second performance test (e.g., ping test, packet downloading test, etc.) to estimate or determine the performance of the service under the second deployment configuration, and to record the results of the second performance test under the second deployment configuration. The orchestrator system 320 may be configured to iteratively or continuously perform the instantiation of the virtual agents in all possible deployment configurations, so as to estimate or determine the performance of the service under all possible deployment configurations. Alternatively, the orchestrator system 320 may be configured to iteratively or continuously perform the instantiation of the virtual agents until one or more service metrics are fulfilled or exceeded. Otherwise, the orchestrator system 320 may be configured to iteratively or continuously perform the instantiation of the virtual agents until a threshold value (e.g., a timer value, a counter value, etc.) is achieved or exceeded.

At operation S820, one or more deployment configurations may be selected. Specifically, the orchestrator system 230 may be configured to select the one or more deployment configurations based on the one or more service metrics (e.g., determined at operation S510 in FIG. 5, etc.). For instance, the orchestrator system 230 may compare the service performance estimated or determined from the instantiation of virtual agents (e.g., the results of the performance tests simulated during instantiation of the virtual agents) to one or more minimum service performance requirements defined by the one or more service metrics. Subsequently, the orchestrator system 230 may select the deployment configuration(s) under which the estimated or determined service performance fulfills or exceeds the one or more minimum service performance requirements defined by the one or more service metrics.

By way of example, assuming that the orchestrator system 230 is configured to select one or more deployment configurations for service 1 based on the latency requirement (e.g., a service metric) specified in service metric profile 1 in FIG. 7. In this regard, the orchestrator system 230 may compare the estimated or determined service performance to the latency requirement specified in service metric profile 1 (e.g., latency lower than x1 ms), and may then select deployment configurations under which the latency performance is fulfilled or exceeded (e.g., deployment configuration(s) which can achieve latency lower than x1 ms will be selected).

At operation S830, one or more optimal deployment profiles may be generated. Specifically, the orchestrator system 230 may be configured to generate the one or more optimal deployment profiles based on the selected one or more deployment configurations. In some embodiments, the orchestrator system 230 may generate the one or more optimal deployment profiles by storing or populating the information of the selected one or more deployment configuration in a table. For instance, the orchestrator system 230 may populate the table according to the optimality of the service performance in view of the one or more service metrics. By way of example, assuming that the orchestrator system 230 is configured to generate the optimal deployment profiles based on the latency performance, the orchestrator system 230 may first populate the information of the deployment configuration under which the service has the lowest latency, following by populating the information of the deployment configuration under which the service has the second lowest latency, and the like.

FIG. 9 illustrate a table containing examples of optimal deployment profiles, according to one or more embodiments. The optimal deployment profiles may be generated by the orchestrator system 230 at operation S830 in FIG. 8.

Referring to FIG. 9, a first optimal deployment profile (e.g., deployment profile 1) may define a first optimal deployment configuration in which all network functions (e.g., NF1, NF2, NF3) of the service are deployed in a server of a first data center (illustrated as "far edge DC" in FIG. 9). The first optimal deployment configuration may be the deployment configuration which may theoretically provide the most optimal service performance (e.g., lowest latency, highest throughput, etc.) which fulfill and exceed the minimal service performance requirement defined in the associated service metric profile (e.g., service metric profile 1).

Further, a second optimal deployment profile (e.g., deployment profile 2) may define a second optimal deployment configuration in which the network functions (e.g., NF1, NF2, NF3) of the service are distributedly deployed in a plurality of servers (e.g., NF1 is deployed in the server of the first data center "far edge DC", NF2 is deployed in a server of a second data center "edge DC", and NF3 is deployed in a server of a third data center "central DC"). The second optimal deployment configuration may be the deployment configuration which may theoretically provide the second most optimal service performance (e.g., second lowest latency, second highest throughput, etc.), which is poorer service performance as compared to the service performance deliverable by deployment profile 1 but still fulfill and exceed the minimal service performance requirement defined in the associated service metric profile (e.g., service metric profile 1).

It is contemplated that the information illustrated in FIG. 9 are merely examples of a possible embodiment of present disclosure, and more or less information may be included or excluded, without departing from the scope of the present disclosure. For instance the table may also include information of optimal deployment profiles associated with other service metric profile and/or associated with other services. Further, additional information such as service type, service metric(s) utilized to generate the optimal deployment profile, and the like, may be included, without departing from the scope of the present disclosure.

Figure 10:
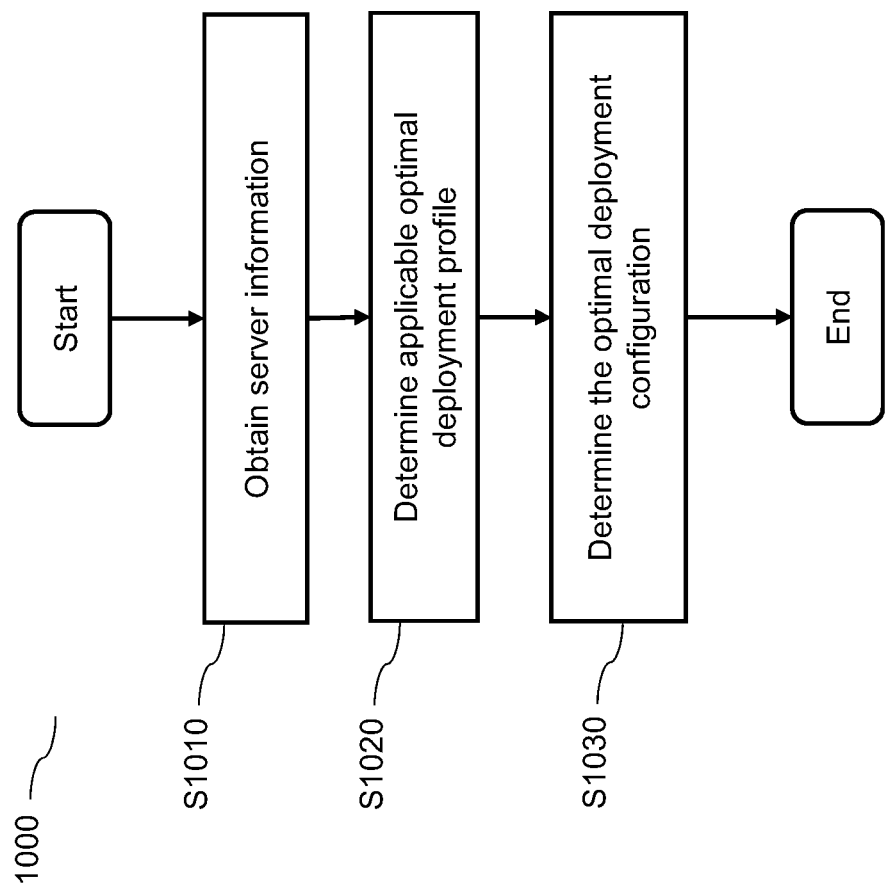
FIG. 10 illustrates another example flow diagram of a method for determining an optimal deployment configuration, according to one or more embodiments.

FIG. 10 illustrates an example flow diagram of a method 1000 for determining an optimal deployment configuration based on the one or more optimal deployment profiles, according to one or more embodiments. Method 1000 may be part of operation S420 in FIG. 4 and/or operation S530 in FIG. 5, and may be performed by the orchestrator system 230 in FIG. 2.

Referring to FIG. 10, at operation S1010, information of one or more servers may be obtained. Specifically, the orchestrator system 230 may be configured to obtain (e.g., obtain directly from server cluster 210, obtain via monitoring system 220, etc.) server status (e.g., health status, resources status, etc.) of one or more servers (e.g., servers 210-1 in server cluster 210, etc.), so as to determine which server(s) may be utilized to deploy the service according to the one or more optimal deployment profiles. For instance, based on determining that the first optimal deployment profile (e.g., deployment profile 1 in FIG. 9) defines a deployment configuration of deploying all NF1, NF2, and NF3 in the server of far edge DC, the orchestrator system 230 may be configured to obtain the information of the server of far edge DC at operation S1010. Subsequently, the orchestrator system 230 may be configured to obtain the information of the server of edge DC and central DC since such information is required for further operations associated to the second optimal deployment profile (e.g., deployment profile 2 in FIG. 10).

At operation S1020, an applicable optimal deployment profile is determined. Specifically, the orchestrator system 230 may be configured to determine, based on the server information obtained at operation S1010, which of the one or more optimal deployment profiles is applicable or is possible to be utilized. For instance, assuming that the first optimal deployment profile (e.g., deployment profile 1 in FIG. 9) requires X server capacity in order to deploy all NF1, NF2, and NF3 in the server of far edge DC, the orchestrator system 230 may be configured to determine, from the server information of the server of far edge DC, whether or not the server of far edge DC has sufficient server capacity (e.g., X capacity or above, etc.) to deploy all NF1, NF2, and NF3 therein. In this regard, if the orchestrator system 230 determines that the server of far edge DC does not have sufficient server capacity to deploy the service (or the associated NF1-NF3) according to the deployment configuration defined in the first optimal deployment profile, even if the deployment configuration defined in the first optimal deployment profile may theoretically provide the best service performance, the orchestrator system 230 will not select the first optimal deployment profile for further operations (i.e., the deployment configuration which may theoretically provide the best service performance does not necessarily be selected as the optimal deployment configuration).

In this example embodiment, assuming that the orchestrator system 230 determines that the servers in the far edge DC, the edge DC, and the central DC can deploy service (or the associated NF1-NF3) according to the deployment configuration defined in the second optimal deployment profile (e.g., deployment profile 2 in FIG. 9), the orchestrator system 230 may determine that the second optimal deployment profile is the applicable optimal deployment profile.

Alternatively, in case the orchestrator system 230 determines that multiple applicable optimal deployment profiles are existing, the orchestrator system 230 may select the optimal deployment profile which may provide the best service performance. For instance, assuming that the orchestrator system 230 determines that both of said first optimal deployment profile and said second optimal deployment profile are applicable, the orchestrator system 230 may determine that the first optimal deployment profile is the applicable optimal deployment profile, since the deployment configuration of the first optimal deployment profile may provide better service performance as compared to the deployment configuration of the second optimal deployment profile.

Referring back to FIG. 10, at operation S1030, the optimal deployment configuration may be determined. Specifically, the orchestrator system 230 may be configured to determine that the deployment configuration of the applicable optimal deployment profile is the optimal deployment configuration.

Although the operations and features described above in relation to FIG. 2 to FIG. 10 are pertaining to a service, it is contemplated that similar operations and features may be applicable to a plurality of services. For instance, the orchestrator system 230 in FIG. 2 may simultaneously perform method 400 for a plurality of services, so as to manage the deployment of the plurality of services at the same time, and the like.

Figure 11A:
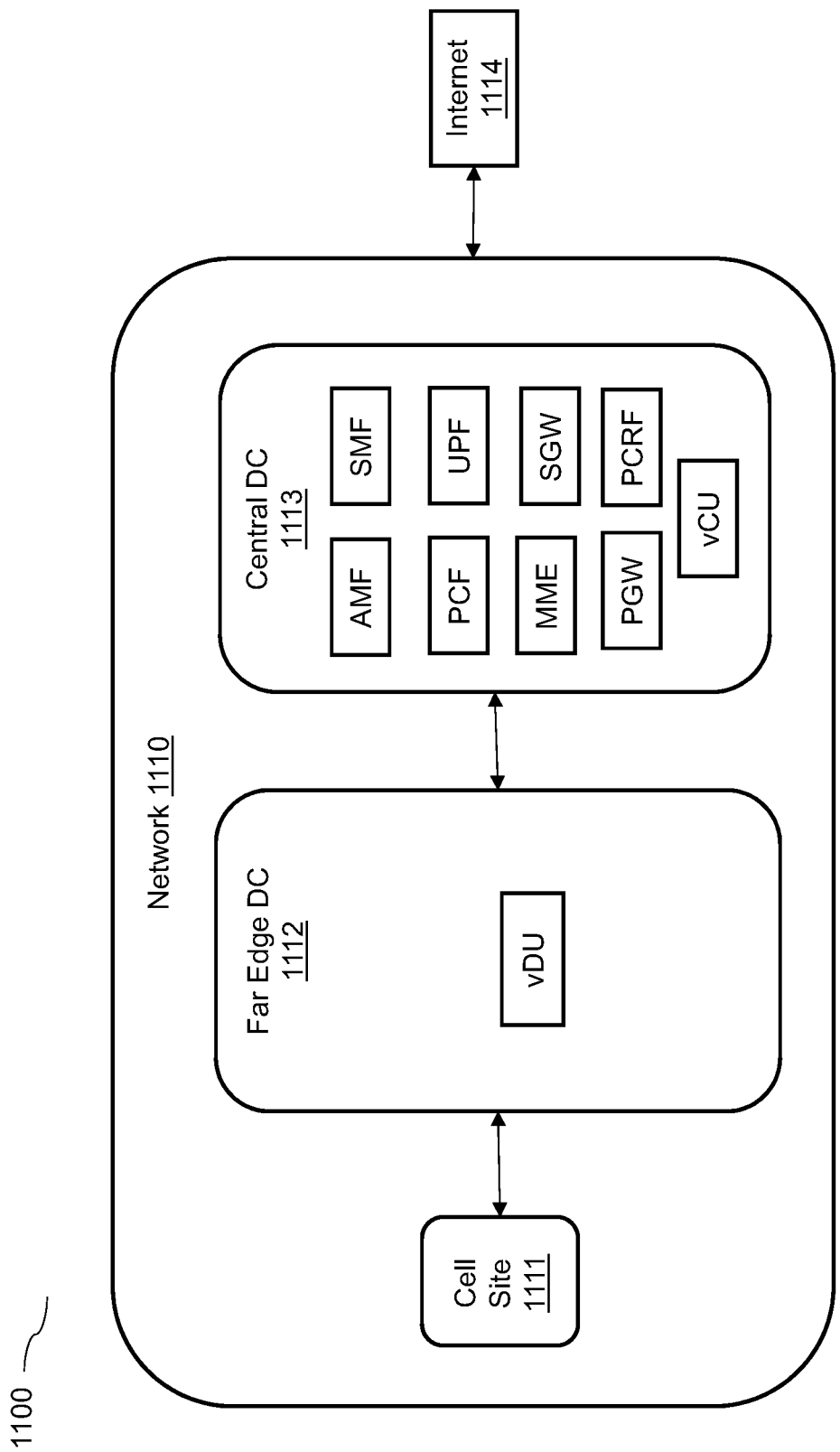
FIG. 11A illustrates an example block diagram of a system in which multiple services are deployed based on a first deployment configuration, according to one or more embodiments.
Figure 11B:
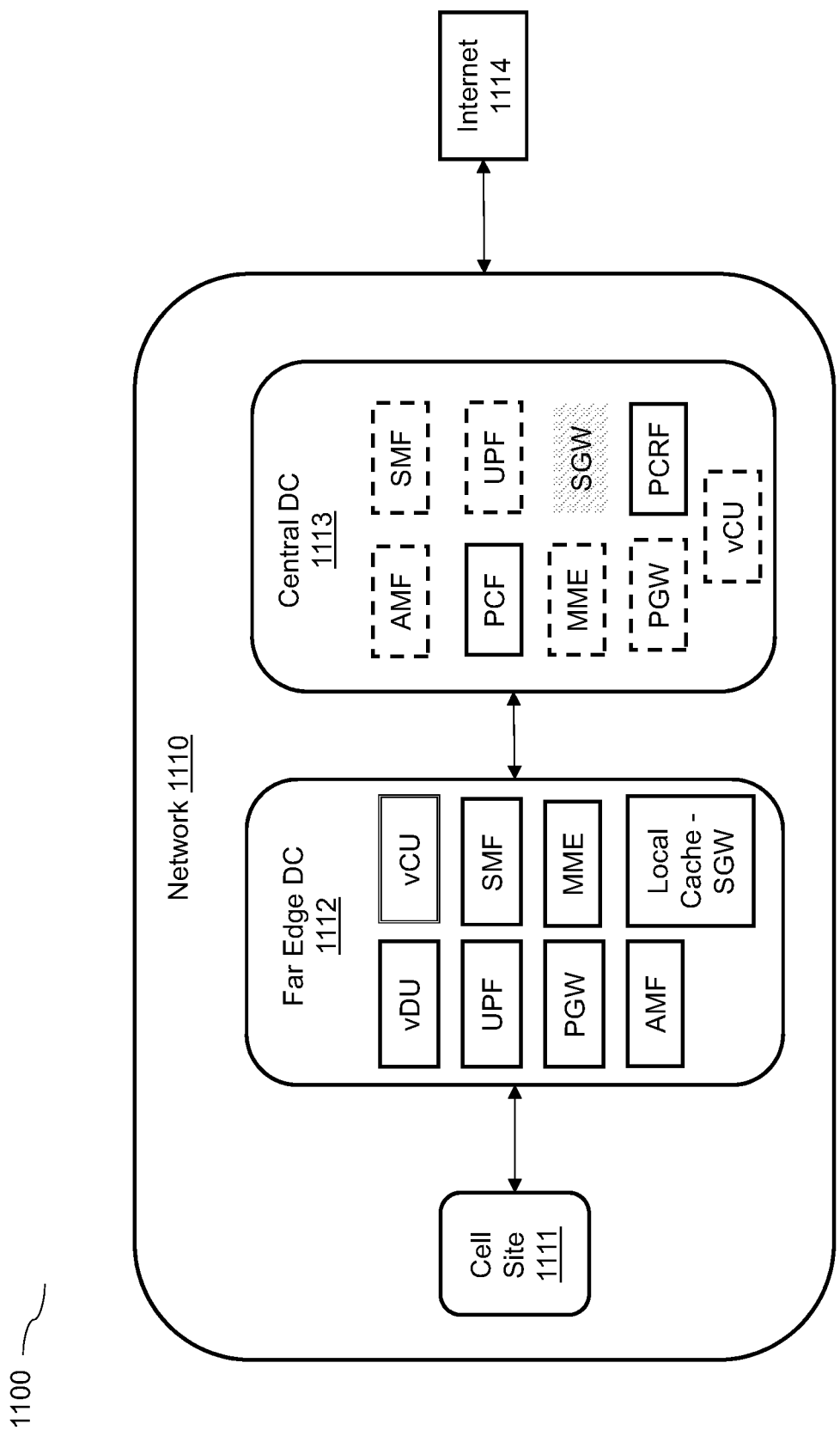
FIG. 11B illustrates an example block diagram of the system in which the multiple services are deployed based on a second deployment configuration, according to one or more embodiments.

FIG. 11A and FIG. 11B described herein below illustrate an example use case of managing deployment of a plurality of services, in which one or more operations and/or one or more features described above in relation to FIG. 2 to FIG. 10 may be applicable. Further, some descriptions provided above in relation to FIG. 1 may also be applicable to FIG.

11A and FIG. 11B. Thus, the redundant descriptions associated therewith may be omitted below for conciseness.

Furthermore, although not explicitly illustrated in FIG. 11A and FIG. 11B, it can be understood that one or more elements in FIG. 11A and FIG. 11B may be communicatively coupled to one or more elements of system 200 in FIG. 2, such that system 200 may be configured to performed one or more operations described above to manage the deployment of the services in FIG. 11A and FIG. 11B. For instance, packet analyzing system 240 of system 200 may be interfacing internet 1114 and network 1110 so as to analyze the data packets passing through the internet 114 and network 1110, the service management system 250 may be communicatively coupled to far edge DC 1112 and central DC 1113 so as to manage the services deployed or hosted therein, and the like.

Referring first to FIG. 11A, which illustrate an example block diagram of a system 1100, in which multiple services are deployed based on a first deployment configuration, according to one or more embodiments.

In this example use case, network 1110 may be a telco network managed by a network operator. Cell site 1111 may have one or more user equipment (UE) communicatively coupled thereto, such that the end user(s) of the one or more UE may utilize the services deployed in network 1110 (e.g., utilize the services to access internet 1114, etc.). The deployed services may include LTE-based telco services (e.g., vDU, vCU, MME, SGW, PGW, PCRF) and 5G-based telco services (e.g., AMF, SMF, PCF, UPF). Merely for descriptive purpose, each of the deployed service is described herein as an independent service, although it is apparent that some of the deployed services may be network functions/network services constitute another services (e.g., vDU and vCU may constitute a vRAN, MME, SGW and PGW may constitute an evolved packet core (EPC), etc.).

Referring still to FIG. 11A, the services are deployed according to the first deployment configuration. Specifically, vDU is deployed in a server of a far edge DC 1112, and other services (e.g., vCU, PGW, MME, SGW, PCRF, AMF, SMF, PCF, UPF) are deployed in one or more servers of central DC 1113. Such deployment configuration may a default deployment configuration pre-defined by the network operator, or may be an optimal deployment configuration automatically determined by the system (e.g., determined by orchestrator system 230 of system 200) at a first period of time.

Assuming that the first deployment configuration are determined or configured to provide high network throughput, at a second period of time, the system (e.g., orchestrator system 230) may receive service information (e.g., analyzed by packet analyzing system 240) indicating that the end users' demand on the service performance has shifted from high network throughput to low network latency. Accordingly, the system (e.g., orchestrator system 230) may determine a new optimal deployment configuration (vie operations described in relation to FIG. 4 to FIG. 10) to redeploy the services so as to provide low network latency.

Referring to FIG. 11B, which illustrates an example block diagram of the system 1100, in which the multiple services are deployed based on a second deployment configuration, according to one or more embodiments. For instance, the services are deployed based on the optimal deployment configuration determined to achieve low network latency. In this example use case, vDU is maintained at the server of far edge DC, PCF and PCRF are maintained at the server of central DC, while vCU, PGW, MME, SGW, AMF, SMF, and UPF are deployed to the server of far edge DC. Further, vCU, PGW, MME, AMF, SMF, and UPF may be temporarily deployed to the server of far edge DC (e.g., deploy for a period of time, deploy for a session, etc.), while SGW may be deployed in a local cache of the server of the far edge DC, such that SGW may be maintained in the far edge DC for a longer time as compared to other temporarily deployed services. On the other hand, the server of the central DC may temporarily utilize the resources (assigned to vCU, PGW, MME, AMF, SMF, and UPF) for other operations (e.g., utilize the resources for the period of time or session in which the associated services are deployed to the server of far edge DC), and may utilize the resources assigned to SGW for a longer time (e.g., utilize said resources until SGW is redeployed to the server of central DC). Since the SGW is stored in the local cache of the far edge DC, the associated function can be directly performed at the far edge DC, without requiring to route through the central DC. It can be understood that the local cache may also be configured to store any other suitable information, such as information retrieved from internet 1114, so that said information may be directly provided to the end users from the far edge DC when being requested, without accessing the internet 1114.

In view of the above, example embodiments of the present disclosures provide systems and methods to automatically and dynamically managing deployment of one or more services. Specifically, the systems and methods of the present disclosures may automatically analyze behavior of users of one or more services, automatically determine one or more optimal deployment configurations based on the users' behavior, and dynamically manage the deployment of the one or more services in real-time or near real-time.

Ultimately, example embodiments of the present disclosures are suitable for managing deployment of both non-telco services and telco services. Further, the example embodiments of the present disclosure reduce the end user's and network operator's burden in managing the service deployment, are efficient in responding to high dynamic and frequently change user's demand in service performance, and may ensure that the deployment configuration of the service is always optimal so that the user's experience can be guaranteed.

Figure 12:
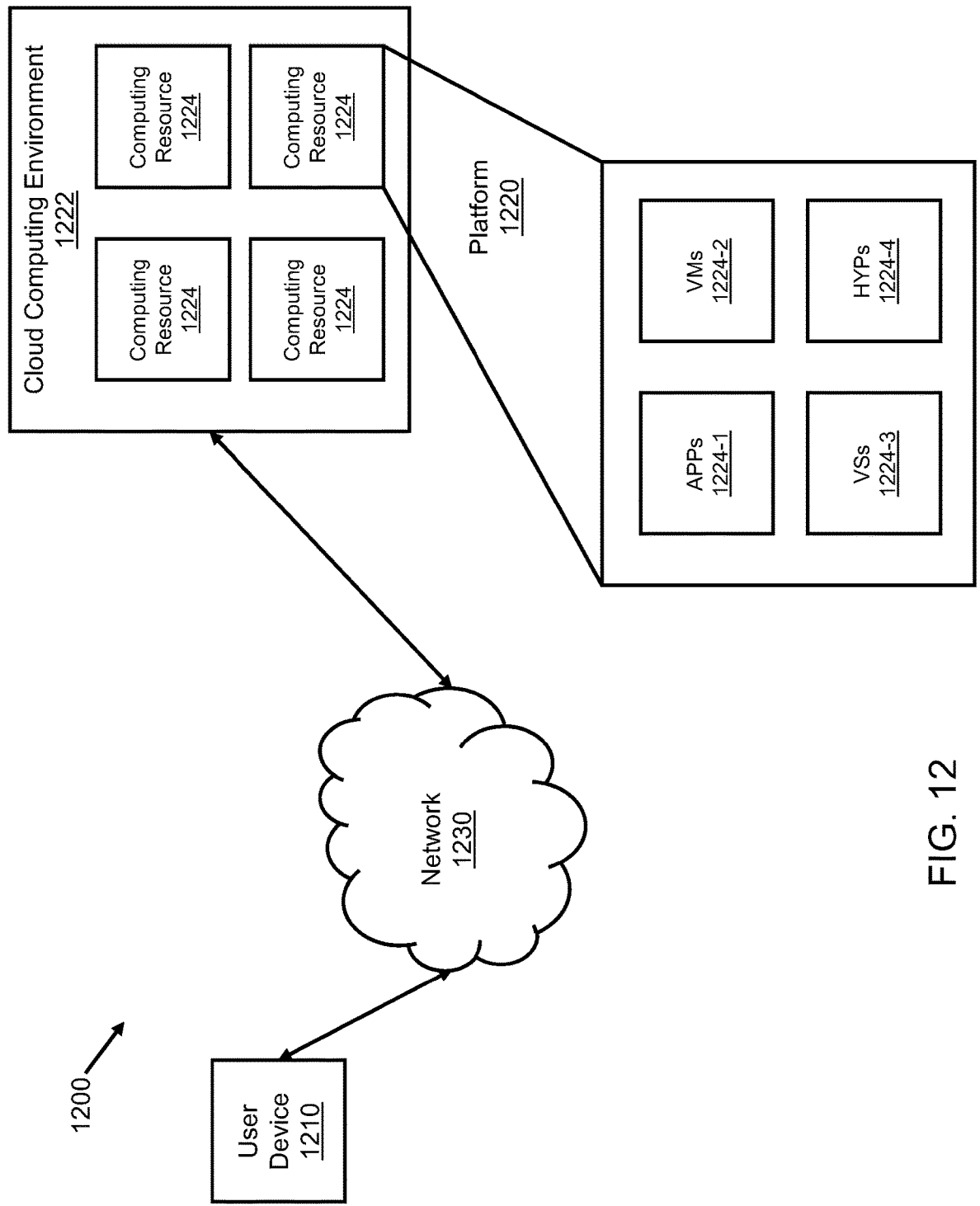
FIG. 12 is a diagram of an example environment in which systems and/or methods, described herein, may be implemented.

FIG. 12 is a diagram of an example environment 1200 in which systems and/or methods, described herein, may be implemented. As shown in FIG. 12, environment 1200 may include a user device 1210, a platform 1220, and a network 1230. Devices of environment 1200 may interconnect via wired connections, wireless connections, or a combination of wired and wireless connections. In embodiments, any of the functions and operations described with reference to FIG. 2 through FIG. 11B above may be performed by any combination of elements illustrated in FIG. 12.

User device 1210 includes one or more devices capable of receiving, generating, storing, processing, and/or providing information associated with platform 1220. For example, user device 1210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), a SIM-based device, or a similar device. In some implementations, user device 1210 may receive information from and/or transmit information to platform 1220. In some embodiments, user device 1210 may corresponds to the user equipment (UE) described above in relation to FIG. 2 through 11(B).

Platform 1220 includes one or more devices capable of receiving, generating, storing, processing, and/or providing information. In some implementations, platform 1220 may include a cloud server or a group of cloud servers. In some implementations, platform 1220 may be designed to be modular such that certain software components may be swapped in or out depending on a particular need. As such, platform 1220 may be easily and/or quickly reconfigured for different uses. In some embodiments, one or more of database 350, processing engine 340, and service management system 330 may be implemented in platform 1220.

In some implementations, as shown, platform 1220 may be hosted in cloud computing environment 1222. Notably, while implementations described herein describe platform 1220 as being hosted in cloud computing environment 1222, in some implementations, platform 1220 may not be cloud-based (i.e., may be implemented outside of a cloud computing environment) or may be partially cloud-based.

Cloud computing environment 1222 includes an environment that hosts platform 1220. Cloud computing environment 1222 may provide computation, software, data access, storage, etc. services that do not require end-user (e.g., user device 1210) knowledge of a physical location and configuration of system(s) and/or device(s) that hosts platform 1220. As shown, cloud computing environment 1222 may include a group of computing resources 1224 (referred to collectively as "computing resources 1224" and individually as "computing resource 1224").

Computing resource 1224 includes one or more personal computers, a cluster of computing devices, workstation computers, server devices, or other types of computation and/or communication devices. In some implementations, computing resource 1224 may host platform 1220. The cloud resources may include compute instances executing in computing resource 1224, storage devices provided in computing resource 1224, data transfer devices provided by computing resource 1224, etc. In some implementations, computing resource 1224 may communicate with other computing resources 1224 via wired connections, wireless connections, or a combination of wired and wireless connections.

As further shown in FIG. 12, computing resource 1224 includes a group of cloud resources, such as one or more applications ("APPs") 1224-1, one or more virtual machines ("VMs") 1224-2, virtualized storage ("VSs") 1224-3, one or more hypervisors ("HYPs") 1224-4, or the like.

Application 1224-1 includes one or more software applications that may be provided to or accessed by user device 1210. Application 1224-1 may eliminate a need to install and execute the software applications on user device 1210. For example, application 1224-1 may include software associated with platform 1220 and/or any other software capable of being provided via cloud computing environment 1222. In some implementations, one application 1224-1 may send/receive information to/from one or more other applications 1224-1, via virtual machine 1224-2.

Virtual machine 1224-2 includes a software implementation of a machine (e.g., a computer) that executes programs like a physical machine. Virtual machine 1224-2 may be either a system virtual machine or a process virtual machine, depending upon use and degree of correspondence to any real machine by virtual machine 1224-2. A system virtual machine may provide a complete system platform that supports execution of a complete operating system ("OS"). A process virtual machine may execute a single program, and may support a single process. In some implementations, virtual machine 1224-2 may execute on behalf of a user (e.g., user device 1210), and may manage infrastructure of cloud computing environment 1222, such as data management, synchronization, or long-duration data transfers.

Virtualized storage 1224-3 includes one or more storage systems and/or one or more devices that use virtualization techniques within the storage systems or devices of computing resource 1224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1224-4 may provide hardware virtualization techniques that allow multiple operating systems (e.g., "guest operating systems") to execute concurrently on a host computer, such as computing resource 1224. Hypervisor 1224-4 may present a virtual operating platform to the guest operating systems, and may manage the execution of the guest operating systems. Multiple instances of a variety of operating systems may share virtualized hardware resources.

Network 1230 includes one or more wired and/or wireless networks. For example, network 1230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 12 are provided as an example. In practice, there may be additional devices and/or networks, fewer devices and/or networks, different devices and/or networks, or differently arranged devices and/or networks than those shown in FIG. 12. Furthermore, two or more devices shown in FIG. 12 may be implemented within a single device, or a single device shown in FIG. 12 may be implemented as multiple, distributed devices. Additionally, or alternatively, a set of devices (e.g., one or more devices) of environment 1200 may perform one or more functions described as being performed by another set of devices of environment 800.

Figure 13:
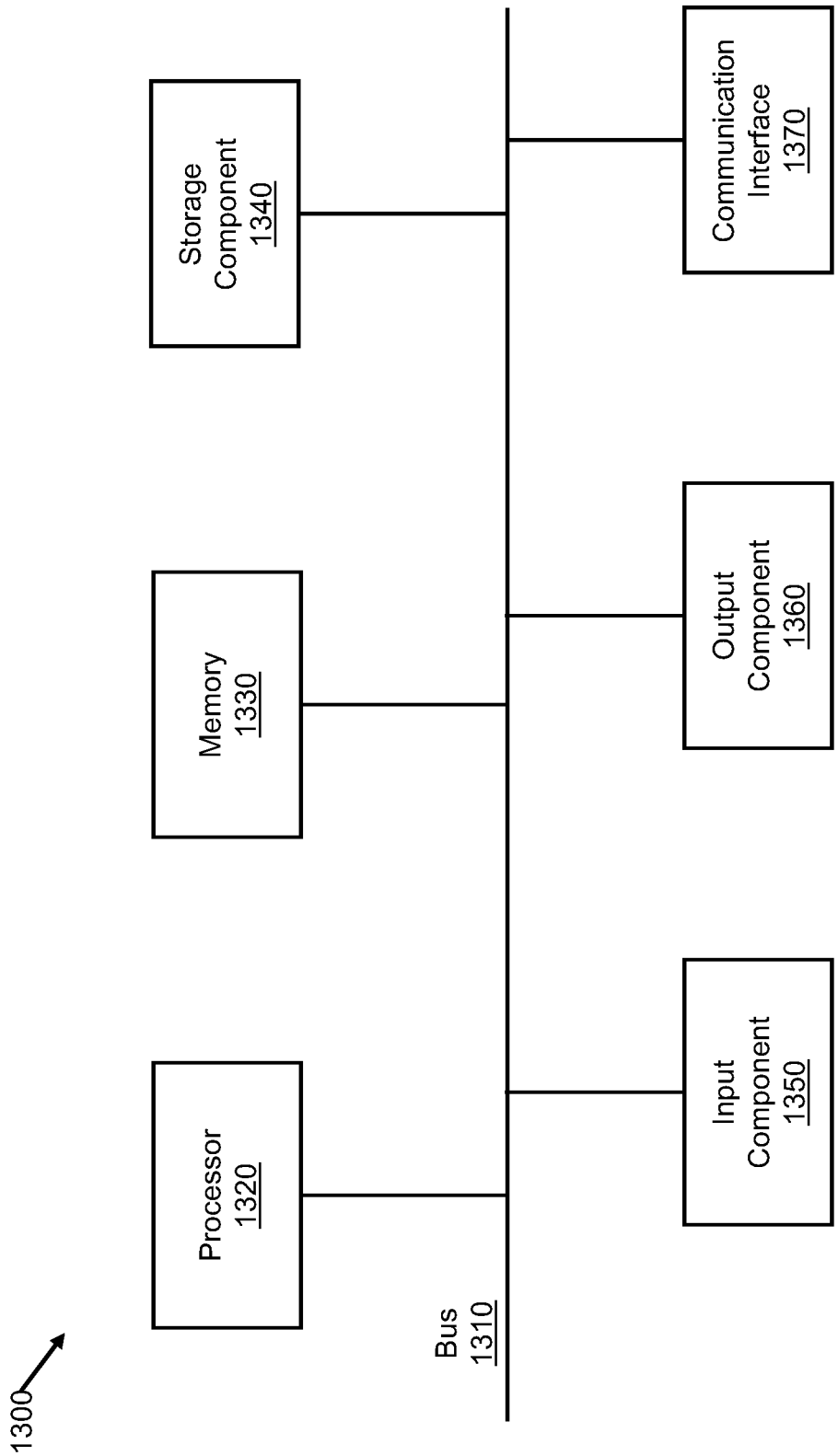
FIG. 13 is a diagram of example components of a device, according to one or more embodiments.

FIG. 13 is a diagram of example components of a device 1300. Device 1300 may correspond to user device 1210 and/or platform 1220. As shown in FIG. 13, device 1300 may include a bus 1310, a processor 1320, a memory 1330, a storage component 1340, an input component 1350, an output component 1360, and a communication interface 1370.

Bus 1310 includes a component that permits communication among the components of device 1300. Processor 1320 may be implemented in hardware, firmware, or a combination of hardware and software. Processor 1320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1320 includes one or more processors capable of being programmed to perform a function. Memory 1330 includes a random access memory (RAM), a read only memory (ROM), and/or another type of dynamic or static storage device (e.g., a flash memory, a magnetic memory, and/or an optical memory) that stores information and/or instructions for use by processor 1320.

Storage component 1340 stores information and/or software related to the operation and use of device 1300. For example, storage component 1340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1350 includes a component that permits device 1300 to receive information, such as via user input (e.g., a touch screen display, a keyboard, a keypad, a mouse, a button, a switch, and/or a microphone). Additionally, or alternatively, input component 1350 may include a sensor for sensing information (e.g., a global positioning system (GPS) component, an accelerometer, a gyroscope, and/or an actuator). Output component 1360 includes a component that provides output information from device 1300 (e.g., a display, a speaker, and/or one or more light-emitting diodes (LEDs)).

Communication interface 1370 includes a transceiver-like component (e.g., a transceiver and/or a separate receiver and transmitter) that enables device 1300 to communicate with other devices, such as via a wired connection, a wireless connection, or a combination of wired and wireless connections. Communication interface 1370 may permit device 1300 to receive information from another device and/or provide information to another device. For example, communication interface 1370 may include an Ethernet interface, an optical interface, a coaxial interface, an infrared interface, a radio frequency (RF) interface, a universal serial bus (USB) interface, a Wi-Fi interface, a cellular network interface, or the like.

Device 1300 may perform one or more processes described herein. Device 1300 may perform these processes in response to processor 1320 executing software instructions stored by a non-transitory computer-readable medium, such as memory 1330 and/or storage component 1340. A computer-readable medium is defined herein as a non-transitory memory device. A memory device includes memory space within a single physical storage device or memory space spread across multiple physical storage devices.

Software instructions may be read into memory 1330 and/or storage component 1340 from another computer-readable medium or from another device via communication interface 1370. When executed, software instructions stored in memory 1330 and/or storage component 1340 may cause processor 1320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 13 are provided as an example. In practice, device 1300 may include additional components, fewer components, different components, or differently arranged components than those shown in FIG. 13. Additionally, or alternatively, a set of components (e.g., one or more components) of device 1300 may perform one or more functions described as being performed by another set of components of device 1300.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus comprising:
   a memory storing instructions; and
   at least one processor configured to execute the instructions to:
   receive information associated with a service, the information being information on data packets of network traffic associated with the service;
   determine, based on the received information, a performance goal for the service;
   determine, based on the performance goal, an optimal deployment configuration for providing the service in accordance with a predefined minimal service performance requirement corresponding to the determined performance goal;
   determine whether or not the service is to be deployed according to the optimal deployment configuration; and
   based on determining that the service is to be deployed according to the optimal deployment configuration, deploying the service to be deployed by outputting information defining an action for deploying the service according to the optimal deployment configuration,
   wherein the at least one processor is configured to execute the instructions to determine the optimal deployment configuration by determining, based on the determined performance goal, a service metric profile from among a plurality of pre-stored service metric profiles, wherein the plurality of pre-stored service metric profiles include service metrics respectively defining different minimal service performance requirements, and
   wherein the service metric profile is determined from among the plurality of pre-stored service metric profiles as having a minimal service performance requirement that satisfies the performance goal for providing the service, the performance goal being determined according to an analysis result of the received information.

2. The apparatus as claimed in claim 1, wherein the at least one processor is configured to execute the instructions to determine the optimal deployment configuration by:
   determining, based on the received information, one or more service metrics associated with the service, wherein the one or more service metrics respectively define a minimal service performance requirement;
   determining, based on the one or more service metrics, one or more optimal deployment profiles; and
   determining, based on the one or more optimal deployment profiles, the optimal deployment configuration.

3. The apparatus as claimed in claim 2, wherein the at least one processor is configured to execute the instructions to determine the one or more service metrics by:
   determining, based on the received information, an identifier (ID) of the service;
   obtaining, based on the ID, the one or more service metric profiles corresponding to the service; and determining, based on the obtained one or more service metric profiles, the one or more service metrics.

4. The apparatus as claimed in claim 2, wherein the at least one processor is configured to execute the instructions to determine the one or more optimal deployment profiles by:

instantiating, based on a plurality of deployment configurations, one or more virtual agents associated with the service;

simulating the deployment of the one or more virtual agents based on a plurality of possible deployment configurations, to estimate or determine a service performance under the plurality of possible deployment configurations;

recording the service performance;

comparing the service performance estimated or determined from the instantiation of the one or more virtual agents to one or more minimum service performance requirements defined by the one or more service metrics;

selecting, based on the one or more service metrics, one or more deployment configurations from the plurality of deployment configurations; and generating, based on the selected one or more deployment configurations, the one or more optimal deployment profiles.

5. The apparatus as claimed in claim 2, wherein the at least one processor is configured to execute the instructions to determine the optimal deployment configuration by:

receiving information associated with one or more servers;

determining, based on the information associated with the one or more servers, an applicable optimal deployment profile from the one or more optimal deployment profiles; and determining that the deployment configuration defined in the applicable optimal deployment profile is the optimal deployment configuration.

6. The apparatus as claimed in claim 1, wherein the action for deploying the service is an action to store the service in a local cache of a server.

7. The apparatus as claimed in claim 1, wherein the action for deploying the service is an action to temporarily deploy the service in a server for a predetermined period of time.

8. A method, performed by at least one processor, comprising:

receiving information associated with a service, the information being information on data packets of network traffic associated with the service;

determining, based on the received information, a performance goal for the service;

determining, based on the performance goal, an optimal deployment configuration for providing the service in accordance with a predefined minimal service performance requirement corresponding to the determined performance goal;

determining whether or not the service is to be deployed according to the optimal deployment configuration; and based on determining that the service is to be deployed according to the optimal deployment configuration, deploying the service to be deployed by outputting information defining an action for deploying the service according to the optimal deployment configuration, wherein the determining the optimal deployment configuration comprises determining, based on the determined performance goal, a service metric profile from among a plurality of pre-stored service metric profiles, wherein the plurality of pre-stored service metric profiles include service metrics respectively defining different minimal service performance requirements, and wherein the determining the service metric profile comprises determining whether a minimal service performance requirement satisfies the performance goal for providing the service, the performance goal being determined according to an analysis result of the received information, and determining the service metric profile in a state in which the minimal service performance requirement satisfies the performance goal for providing the service.

9. The method as claimed in claim 8, wherein the determining of the optimal deployment configuration comprises:

determining, based on the received information, one or more service metrics associated with the service, wherein the one or more service metrics respectively define a minimal service performance requirement;

determining, based on the one or more service metrics, one or more optimal deployment profiles; and determining, based on the one or more optimal deployment profiles, the optimal deployment configuration.

10. The method as claimed in claim 9, wherein the determining of the one or more service metrics comprises:

determining, based on the received information, an identifier (ID) of the service;

obtaining, based on the ID, the one or more service metric profiles corresponding to the service; and determining, based on the obtained one or more service metric profiles, the one or more service metrics.

11. The method as claimed in claim 9, wherein the determining of the one or more optimal deployment profiles comprises:

instantiating, based on a plurality of deployment configurations, one or more virtual agents associated with the service;

simulating the deployment of the one or more virtual agents based on a plurality of possible deployment configurations, to estimate or determine a service performance under the plurality of possible deployment configurations;

recording the service performance;

comparing the service performance estimated or determined from the instantiation of the one or more virtual agents to one or more minimum service performance requirements defined by the one or more service metrics;

selecting, based on the one or more service metrics, one or more deployment configurations from the plurality of deployment configurations; and generating, based on the selected one or more deployment configurations, the one or more optimal deployment profiles.

12. The method as claimed in claim 9, wherein the determining of the optimal deployment configuration comprises:

receiving information associated with one or more servers;

determining, based on the information associated with the one or more servers, an applicable optimal deployment profile from the one or more optimal deployment profiles; and determining that the deployment configuration defined in the applicable optimal deployment profile is the optimal deployment configuration.

13. The method as claimed in claim 8, wherein the action for deploying the service is an action to store the service in a local cache of a server.

14. The method as claimed in claim 8, wherein the action for deploying the service is an action to temporarily deploy the service in a server for a predetermined period of time.

15. A non-transitory computer-readable recording medium having recorded thereon instructions executable by a processor to cause the processor to perform a method comprising:
　　receiving information associated with a service, the information being information on data packets of network traffic associated with the service;
　　determine, based on the received information, a performance goal for the service;
　　determining, based on the performance goal, an optimal deployment configuration for providing the service in accordance with a predefined minimal service performance requirement corresponding to the determined performance goal;
　　determining whether or not the service is to be deployed according to the optimal deployment configuration; and
　　based on determining that the service is to be deployed according to the optimal deployment configuration, deploying the service to be deployed by outputting information defining an action for deploying the service according to the optimal deployment configuration,
　　wherein the determining the optimal deployment configuration comprises determining, based on the determined performance goal, a service metric profile from among a plurality of pre-stored service metric profiles, wherein the plurality of pre-stored service metric profiles include service metrics respectively defining different minimal service performance requirements, and
　　wherein the determining the service metric profile comprises determining whether a minimal service performance requirement satisfies the performance goal for providing the service, the performance goal being determined according to an analysis result of the received information, and determining the service metric profile in a state in which the minimal service performance requirement satisfies the performance goal for providing the service.

16. The non-transitory computer-readable recording medium as claimed in claim 15, wherein the determining of the optimal deployment configuration comprises:
　　determining, based on the received information, one or more service metrics associated with the service, wherein the one or more service metrics respectively define a minimal service performance requirement;
　　determining, based on the one or more service metrics, one or more optimal deployment profiles; and
　　determining, based on the one or more optimal deployment profiles, the optimal deployment configuration.

17. The non-transitory computer-readable recording medium as claimed in claim 16, wherein the determining of the one or more service metrics comprises:
　　determining, based on the received information, an identifier (ID) of the service;
　　obtaining, based on the ID, the one or more service metric profiles corresponding to the service; and
　　determining, based on the obtained one or more service metric profiles, the one or more service metrics.

18. The non-transitory computer-readable recording medium as claimed in claim 16, wherein the determining of the one or more optimal deployment profiles comprises:
　　instantiating, based on a plurality of deployment configurations, one or more virtual agents associated with the service;
　　simulating the deployment of the one or more virtual agents based on a plurality of possible deployment configurations, to estimate or determine a service performance under the plurality of possible deployment configurations;
　　recording the service performance;
　　comparing the service performance estimated or determined from the instantiation of the one or more virtual agents to one or more minimum service performance requirements defined by the one or more service metrics;
　　selecting, based on the one or more service metrics, one or more deployment configurations from the plurality of deployment configurations; and
　　generating, based on the selected one or more deployment configurations, the one or more optimal deployment profiles.

19. The non-transitory computer-readable recording medium as claimed in claim 16, wherein the determining of the optimal deployment configuration comprises:
　　receiving information associated with one or more servers;
　　determining, based on the information associated with the one or more servers, an applicable optimal deployment profile from the one or more optimal deployment profiles; and
　　determining that the deployment configuration defined in the applicable optimal deployment profile is the optimal deployment configuration.

20. The non-transitory computer-readable recording medium as claimed in claim 15, wherein the action for deploying the service is an action to store the service in a local cache of a server.

* * * * *